US012711006B2

(12) United States Patent
Frazier et al.

(10) Patent No.: US 12,711,006 B2
(45) Date of Patent: Aug. 18, 2026

(54) SYSTEMS AND METHODS FOR AUTOMATICALLY OBSERVING AND SUPERVISING ACTIVITIES IN AN ENVIRONMENT

(71) Applicant: Saddlepoint Labs LLC, Ithaca, NY (US)

(72) Inventors: Peter Frazier, Ithaca, NY (US); Nicholas Abbott, Lansing, NY (US)

(73) Assignee: Saddlepoint Labs LLC, Ithaca, NY (US)

( * ) Notice: Subject to any disclaimer, the term of this patent is extended or adjusted under 35 U.S.C. 154(b) by 13 days.

(21) Appl. No.: 18/980,804

(22) Filed: Dec. 13, 2024

(65) Prior Publication Data

US 2025/0217218 A1 Jul. 3, 2025

Related U.S. Application Data

(60) Provisional application No. 63/572,632, filed on Apr. 1, 2024, provisional application No. 63/609,676, filed on Jan. 2, 2024.

(51) Int. Cl.
*G06F 11/07* (2006.01)

(52) U.S. Cl.
CPC ................................ *G06F 11/0751* (2013.01)

(58) Field of Classification Search
CPC ..... G06F 11/07; G06F 11/0751; G16H 10/40; G01N 35/0099; G01N 35/00; G06N 20/00
USPC ...... 702/19, 182, 183, 187, 185; 703/13, 14, 703/11, 17, 16; 716/136, 113, 106; 714/48
See application file for complete search history.

(56) References Cited

U.S. PATENT DOCUMENTS 10,540,225 B2 * 1/2020 Kaur .................. G05B 23/0262
12,223,456 B1 * 2/2025 Manohar ................ G06F 40/30
2013/0078624 A1 * 3/2013 Holmes .................. G01N 35/00 73/61.52
2013/0080071 A1 * 3/2013 Holmes .................. G16B 50/00 702/19

(Continued)

*Primary Examiner* — Kamini B Patel
(74) *Attorney, Agent, or Firm* — Padowithz Alce; Alce PLLC

(57) ABSTRACT

A computer-implemented system, computer-implemented method, and computer-program product includes an experimentation anomaly detection service extracting, from a digital artifact, a first sequence of experiment activities for a target experiment procedure; constructing a second sequence of experiment activities; detecting an anomalous deviation from the first sequence of experiment activities based on the second sequence of experimental activities; and generating a message indicating the anomalous deviation has been detected, thereby enabling a correction of the anomalous deviation within the experimentation workspace. Constructing the second sequence may include collecting, via one or more sensors, environment data from an experimentation workspace; extracting, from the collected environment data, a set of activity features; identifying, from the extracted set of activity features, a set of target objects; detecting an experiment activity based on the collected environment data; and adding the experiment activity to the second sequence.

20 Claims, 13 Drawing Sheets

(56) References Cited

U.S. PATENT DOCUMENTS

2014/0172311 A1* 6/2014 Cembrowski .... G01N 35/00613 702/19
2016/0314255 A1* 10/2016 Cook .................... G06F 16/906
2019/0238575 A1* 8/2019 Hodgman ........... H04L 63/1433
2019/0331701 A1* 10/2019 Polley ................ G01N 35/0099
2021/0232577 A1* 7/2021 Ogawa ................. G06V 40/174
2021/0297432 A1* 9/2021 Hicks ...................... G06F 11/26
2021/0397821 A1* 12/2021 Martinez ................ G06N 20/00
2023/0127651 A1* 4/2023 Cella ...................... G06N 3/045 705/7.11
2023/0222454 A1* 7/2023 Cella ........................ G06N 5/01 705/28
2023/0319241 A1* 10/2023 Turiello ............... G06Q 90/205 348/143
2024/0394089 A1* 11/2024 Kelly .................. G06F 9/45558

* cited by examiner

FIG. 2

Figure 2A:
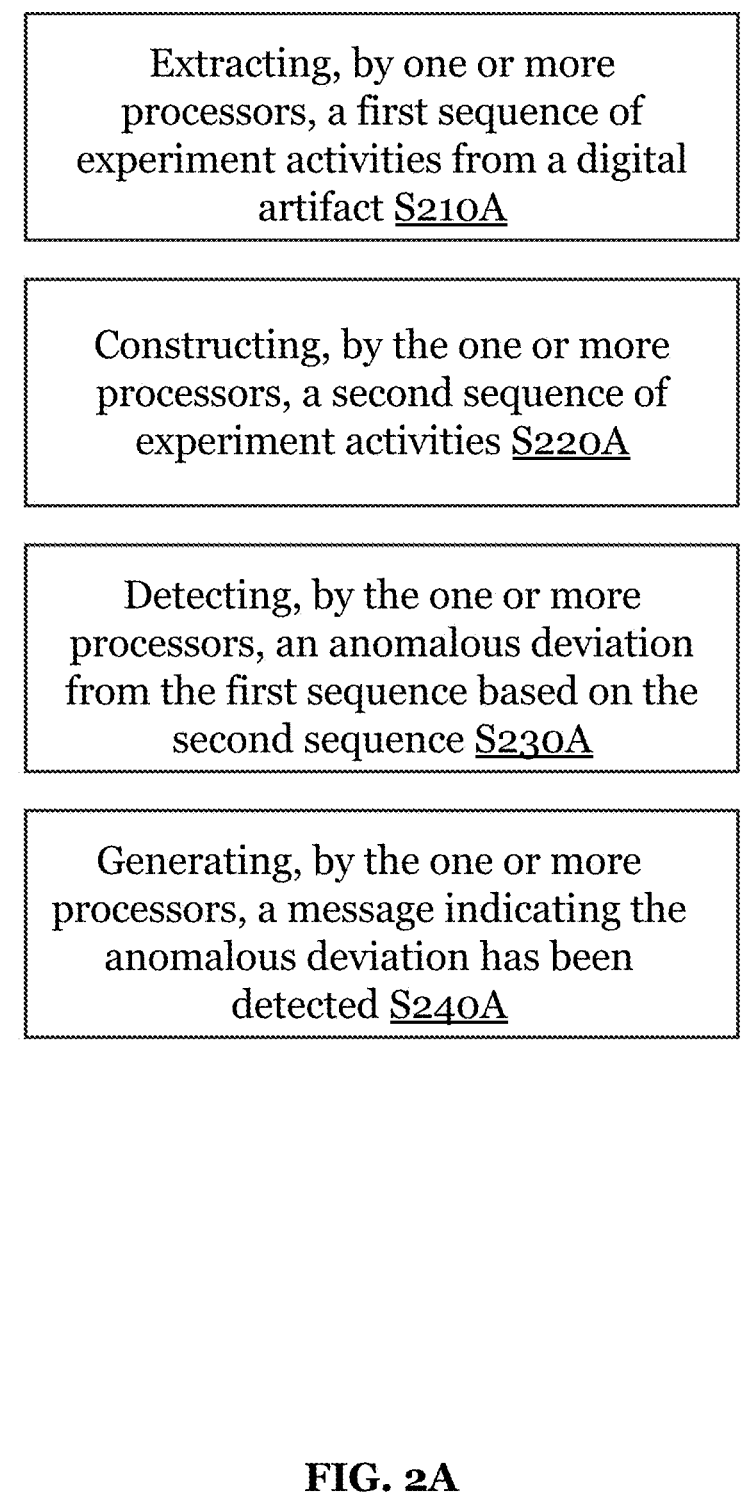

Extracting, by one or more processors, a first sequence of experiment activities from a digital artifact S210A Constructing, by the one or more processors, a second sequence of experiment activities S220A Detecting, by the one or more processors, an anomalous deviation from the first sequence based on the second sequence S230A Generating, by the one or more processors, a message indicating the anomalous deviation has been detected S240A

SYSTEMS AND METHODS FOR AUTOMATICALLY OBSERVING AND SUPERVISING ACTIVITIES IN AN ENVIRONMENT

CROSS-REFERENCE TO RELATED APPLICATIONS

This application claims the benefit of U.S. Provisional Application No. 63/572,632, filed on 1 Apr. 2024, which claims the benefit of U.S. Provisional Application No. 63/609,676, filed on 13 Dec. 2023, which are incorporated in their entireties by this reference.

TECHNICAL FIELD

The inventions herein relate generally to the laboratory environment management field, and more specifically to a new and useful system and method for automatically observing and supervising activities in the laboratory environment management field.

BACKGROUND

Contemporary laboratory environments are monitored and controlled using an array of methods to promote safety and efficiency during various scientific, research, and experimental procedures. These methods typically require strict adherence to standard operating procedures (SOPs) and regulations that must be manually tracked and followed to ensure step-by-step compliance while researchers engage in their tasks. Such methods are often difficult to implement without human error resulting from deviations from SOPs, which may occur due to procedure complexities, miscommunications, lack of awareness, and/or other inefficiencies. Additionally, it is frequently challenging to record and/or determine the exact steps or actions taken during a procedure that may have impacted the success or failure of the procedure.

Therefore, there is a need in the laboratory environment management field to create improved systems and methods for implementing automatic observation and supervision of activities in environments. The embodiments of the present application described herein provide technical solutions that address, at least, the needs described above, as well as the deficiencies of the state of the art.

BRIEF SUMMARY OF THE EMBODIMENT(S)

In some embodiments, the computer-implemented method may comprise at an experimentation anomaly detection service: extracting, by one or more processors, a first sequence of experiment activities from a digital artifact for a target experiment procedure; constructing, by the one or more processors, a second sequence of experiment activities, wherein constructing the second sequence of experiment activities comprises: collecting, by the one or more processors at each timepoint of a set of timepoints and via one or more sensors, environment data from an experimentation workspace; extracting, by the one or more processors and from the collected environment data, a set of activity features; identifying, by the one or more processors and from the extracted set of activity features, a set of target objects; detecting, by the one or more processors and using a machine learning model, an experiment activity based at least in part on the collected environment data; and adding, by the one or more processors, the experiment activity to the second sequence of experiment activities; detecting, by the one or more processors, an anomalous deviation from the first sequence of experiment activities based at least in part on the second sequence of experimental activities; and generating, by the one or more processors, a message indicating the anomalous deviation has been detected based at least in part on one or more features of the anomalous deviation, thereby enabling a correction of the anomalous deviation within the experimentation workspace.

In some embodiments of the computer-implemented method, the target set of objects includes: a first object comprising an arrangement of cavities configured to store one or more fluids; and a second object comprising a tip configured to distribute the one or more fluids among the arrangement of cavities.

In some embodiments of the computer-implemented method, detecting the anomalous deviation comprises: detecting, by the one or more processors, a tip-associated error, wherein the tip-associated error comprises a presence of a droplet within the tip of the second object, the presence of the droplet on the tip of the second object, the presence of bubbles within the one or more fluids within the tip, the presence of a dust particle within the tip, or a quantity of liquid within the tip that satisfies a threshold liquid quantity; detecting, by the one or more processors, that the tip of the second object is retreating from a cavity of the arrangement of cavities over a same timepoint of the set of timepoints in which the tip-associated error is present; and the message indicating the anomalous deviation has been detected comprises the message indicating that the droplet is present within the tip of the second object.

In some embodiments, the computer-implemented method may further comprise: providing, by the one or more processors and to a user interface, a first object annotation and a second object annotation, wherein the first object annotation represents the tip of the second object and the second object annotation represents the tip-associated error; and displaying, by the one or more processors, the first object annotation and the second object annotation within a display section of the user interface, wherein the display section depicts the environment data collected by the one or more sensors.

In some embodiments of the computer-implemented method, a first subset of sensors of the one or more sensors comprises a first camera positioned at a first angle; a second subset of sensors of the one or more sensors comprises a second camera positioned at a second angle different from the first angle; the display section depicts the environment data collected by the first camera; the user interface comprises a second display section that depicts the environment data collected by the second camera; and the computer-implemented method further comprises, at the experimentation anomaly detection service: providing, by the one or more processors and to the user interface, a third object annotation that represents the tip of the second object; and displaying, by the one or more processors, the third object annotation within the second display section of the user interface.

In some embodiments of the computer-implemented method, the second camera has a higher magnification than the first camera or wherein the first camera or the second camera are configured to adjust a respective zoom.

In some embodiments of the computer-implemented method, the first object annotation comprises a set of connected keypoints that track a shape and orientation of the tip of the second object between timepoints.

In some embodiments of the computer-implemented method, the first sequence of experiment activities indicates a pattern for visiting the arrangement of cavities for the second object, wherein the pattern for visiting the arrangement indicates to visit a second cavity of the arrangement of cavities subsequent to visiting a first cavity of the arrangement of cavities; detecting the anomalous deviation comprises: detecting, by the one or more processors, that the tip of the second object has visited the first cavity of the arrangement of cavities; detecting, by the one or more processors and after the tip of the second object has visited the first cavity of the arrangement of cavities, that the tip of the second object is moving towards or visiting a third cavity of the arrangement of cavities without detecting, after detecting that the tip of the second object has visited the first cavity, that the tip of the second object has visited the second cavity of the arrangement of cavities; and the message indicating the anomalous deviation has been detected comprises the message indicating that the tip of the second object has failed to visit the second cavity of the arrangement of cavities.

In some embodiments of the computer-implemented method, the first object is overlaid with a third object, the third object comprises a set of light sources, each of the set of light sources is configured to display a light onto a respective cavity of the arrangement of cavities, each cavity of the arrangement of cavities comprises a transparent material, and the message indicating that the anomalous deviation has been detected comprises the respective light source for the third cavity being toggled.

In some embodiments of the computer-implemented method, the computer-implemented method further comprises: at the experimentation anomaly detection service: providing, by the one or more processors and to a user interface, a representation of a path between the tip of the second object and the surface of the first object, wherein the user interface comprises a display section that depicts the environment data collected by the one or more sensors; and displaying, by the one or more processors, the representation of the path within the display section of the user interface.

In some embodiments of the computer-implemented method, the computer-implemented method further comprises providing, by the one or more processors and to a user interface, a first object annotation that represents a form of the first object, wherein the user interface comprises a display section that depicts the environment data collected by the one or more sensors; and displaying, by the one or more processors, the first object annotation within the display section of the user interface.

In some embodiments of the computer-implemented method, the computer-implemented method further comprises providing, by the one or more processors and to a user interface, an indication of a first subset of the cavities of the arrangement of cavities that have been visited by the tip of the second object, wherein the user interface comprises a display section that depicts an arrangement of the arrangement of cavities of the first object; and updating, by the one or more processors, the display section to display the first subset of the cavities of the arrangement of cavities that have been visited by the tip of the second object.

In some embodiments of the computer-implemented method, the first object of the target set of objects is a microplate; the arrangement of cavities of the first object are a grid of wells; the second object of the target set of objects is a pipette or a micropipette; and the tip of the second object is a pipette tip or a micropipette tip.

In some embodiments of the computer-implemented method, the second object comprises a plurality of tips, wherein each of the plurality of tips is configured to distribute the one or more liquids to a respective cavity of the arrangement of cavities.

In some embodiments of the computer-implemented method, constructing the second sequence of experiment activities comprises, at the experimentation anomaly detection service: tracking, by the one or more processors and based at least in part on the extracted set of activity features, the target set of objects, wherein detecting the experiment activity is based at least in part on tracking.

In some embodiments of the computer-implemented method, the computer-implemented method further comprises at the experimentation anomaly service providing, by the one or more processors and to a language model, an indication that the anomalous deviation has occurred; and generating, by the language model, an explanation for the anomalous deviation, wherein the message comprises the explanation for the anomalous deviation.

In some embodiments of the computer-implemented method, the computer-implemented method further comprises at the experimentation anomaly service generating, by the one or more processors and based at least in part on detecting the anomalous deviation, a second message indicating a task for resolving the anomalous deviation; and providing, by the one or more processors, the generated second message to a user interface.

In some embodiments of the computer-implemented method, the experimentation workspace is a training environment, and the experiment activities of the second sequence of experiment activities are based at least in part on one or more actions of a trainee within the training environment, and the one or more actions comprise an erroneous action performed by a trainee within the training environment, wherein the anomalous deviation is detected based at least in part on the erroneous action.

In some embodiments of the computer-implemented method, a computer-implemented method further comprises: at an experimentation anomaly detection service: collecting, by one or more processors and at each timepoint of a set of timepoints and via one or more sensors, environment data from an experimentation workspace; identifying, by the one or more processors and based at least in part on the environment data, a first object and a second object, wherein: the first object comprises a arrangement of cavities configured to store one or more fluids; and the second object comprises a tip configured to distribute the one or more fluids among the arrangement of cavities; detecting, by the one or more processors, a tip-associated error, wherein the tip-associated error comprises a presence of a droplet within the tip of the second object, the presence of the droplet on the tip of the second object, the presence of bubbles within the one or more fluids within the tip, the presence of a dust particle within the tip, a quantity of liquid within the tip that satisfies a threshold liquid quantity, or a combination thereof; detecting, by the one or more processors, that the tip of the second object is retreating from a cavity of the arrangement of cavities over a same timepoint of the set of timepoints in which the tip-associated error is present; and generating, by the one or more processors, a message indicating that the droplet is present within the tip of the second object based at least in part on detecting that the tip of the second object is retreating from the cavity over the same timepoint of the set of timepoints in which the tip-associated error is occurring, thereby enabling a removal of the droplet from the tip of the second object.

In some examples, a computer-implemented system comprises: one or more processors; a memory; and a computer-readable medium operably coupled to the one or more processors, the computer-readable medium having computer-readable instructions stored thereon that, when executed by the one or more processors, cause a computing device to perform operations comprising: at an experimentation anomaly detection service: extracting, by the one or more processors, a first sequence of experiment activities from a digital artifact for a target experimental procedure; constructing, by the one or more processors, a second sequence of experiment activities, wherein constructing the second sequence of experiment activities comprises: collecting, by the one or more processors at each timepoint of a set of timepoints and via one or more sensors, environment data from an experimentation workspace; extracting, by the one or more processors and from the collected environment data, a set of activity features; identifying, by the one or more processors and from the extracted set of activity features, a set of target objects; detecting, by the one or more processors and using a machine learning model, an experiment activity based at least in part on the collected environment data; and adding, by the one or more processors, the experiment activity to the second sequence of experiment activities; detecting, by the one or more processors, an anomalous deviation from first sequence of experiment activities based at least in part on the second sequence of experiment activities; and generating, by the one or more processors, a message indicating the anomalous deviation has been detected based at least in part on one or more features of the anomalous deviation, thereby enabling a correction of the anomalous deviation within the experimentation workspace.

BRIEF DESCRIPTION OF THE FIGURES

FIGS. 2 and 2A illustrate examples of methods 200 and 200A in accordance with one or more embodiments of the present application;

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Figure 1:
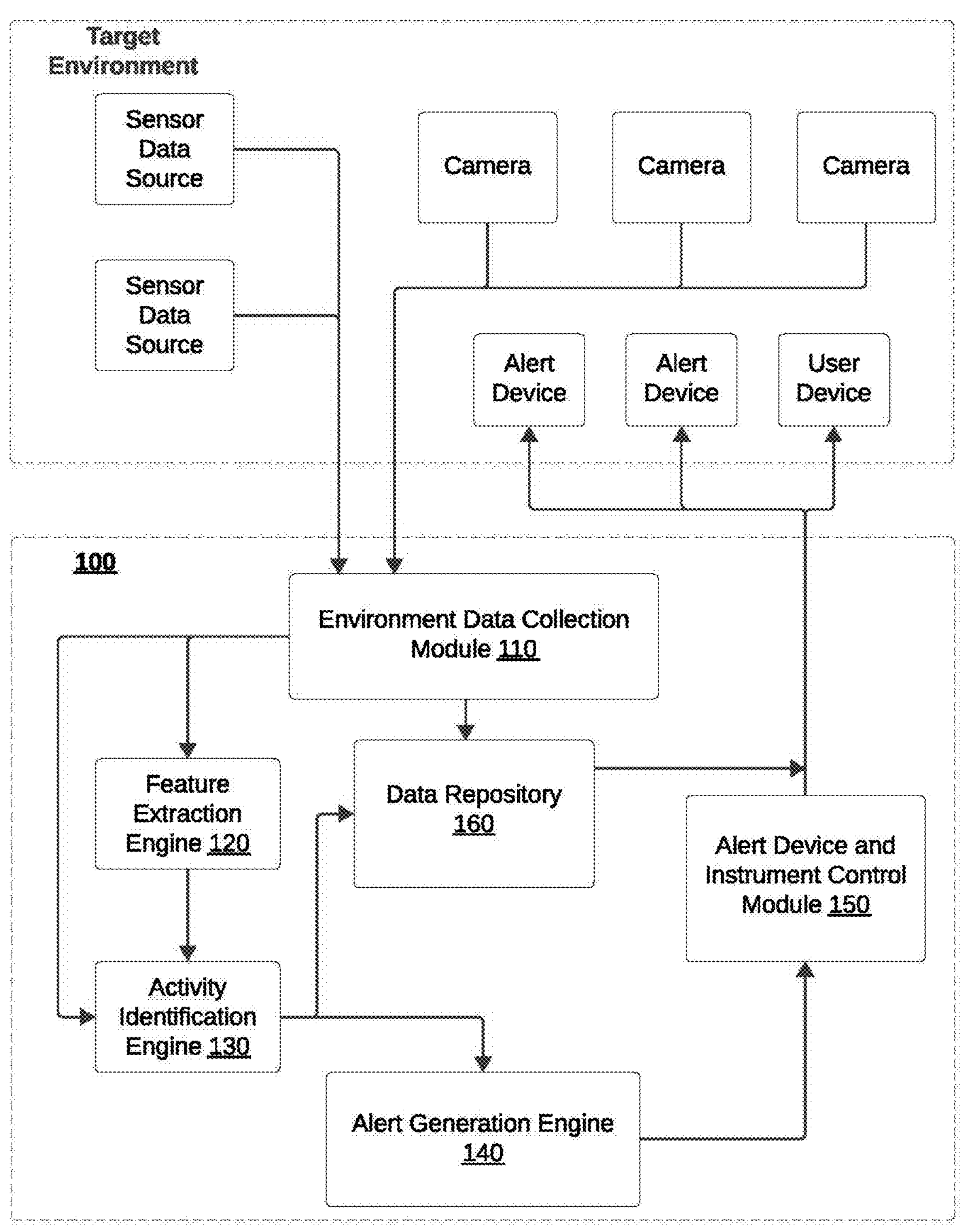
FIG. 1 illustrates a schematic representation of a system 100 in accordance with one or more embodiments of the present application.

1. System for Automatically Observing and Supervising Activities in an Environment As shown in FIG. 1, a system 100 for automatically observing and supervising activities in an environment includes an environment data collection module 110, a feature extraction engine 120, an activity identification engine 130, an alert generation engine 140, and an alert device control module 150. In some embodiments, system 100 may additionally include a data repository 160.

In various embodiments, system 100 may be implemented and/or installed in environments that may include, but are not limited to, wet chemistry laboratories, biological research laboratories, clinical trial testing laboratories, and/or any other suitable laboratory environment for the observation and supervision of environment activities. Additionally, in various embodiments, system 100 may be implemented and/or installed in environments including, but not limited to, medical clinics, oil refineries, chemical manufacturing plants, manufacturing facilities, construction sites, restaurants, home kitchens, and/or any other suitable environment for the observation and supervision of environment activities.

1.1 Environment Data Collection Module

The environment data collection module 110 may preferably function to source, collect, and/or aggregate environment data that may be processed, stored, and/or otherwise used by system 100 and/or one or more users of system 100. In various embodiments environment data collection module 110 may be in operable communication with and/or source environment data from one or more sensors, detectors, sensor arrays, cameras, instruments, apparatuses, and/or the like that may be arranged to collect environment data from a target environment. In various embodiments, environment data collection module 110 may function to store collected data in and/or retrieve environment data from data storage that may be included in the one or more sensors, detectors, sensor arrays, cameras, instruments, apparatuses, and/or the like. Additionally, or alternatively, in some embodiments environment data collection module 110 may source or receive stored environment data from one or more local or remote servers, cloud storage, and/or any other suitable data storage device. Additionally, or alternatively, in some embodiments, the data stored can be used to design future experiments, make predictions, or identify optimal manufacturing process conditions. Preferably, environment data collected by environment data collection module 110 may include visual or audiovisual environment data sourced from one or more cameras arranged with a field of view that includes the target environment.

1.2 Feature Extraction Engine

The feature extraction engine 120 may preferably function to extract one or more activity features relating to one or more tasks, actions, and/or any other activities performed or executed in the target environment (as described in 2.2). In various embodiments, feature extraction engine 120 may function to transform raw environment data into a format or structure that captures information relevant to activities performed or executed in the target environment. Preferably, feature extraction engine 120 may assess or analyze input environment data and output one or more activity features extracted from the environment data. In some preferred embodiments, feature extraction engine 120 may function to process visual or audiovisual environment data (e.g., video data) and in turn extract one or more patterns, structures, objects, entities/actors, and/or any other salient visual information from the input visual or audiovisual environment data.

1.3 Activity Identification Engine

The activity identification engine 130 may preferably function to identify one or more environment activities performed or executed in the target environment based on an input of one or more extracted activity features and/or collected environment data (as described in 2.3). In various embodiments, activity identification engine 130 may function to compute or output one or more environment activity inferences that may each include a label or classification of an associated environment activity, a quality assessment of an associated environment activity, and/or temporal boundaries that may define start and end timestamps of an associated environment activity. Additionally, or alternatively, in one or more embodiments, activity identification engine 130 may function to identify one or more environment activity temporal sequences that may relate to a target process being performed or executed in the target environment.

In various embodiments, feature extraction engine 120 and/or activity identification engine 130 may implement or otherwise employ one or more machine learning algorithms and/or one or more ensembles of trained machine learning models. In such embodiments, the one or more machine learning algorithms and/or one or more ensembles of trained machine learning models may include one or more of: supervised learning (e.g., using logistic regression, using neural networks trained with backpropagation, using random forests, decision trees, etc.), unsupervised learning (e.g., using an Apriori algorithm, using K-means clustering), semi-supervised learning, weakly-supervised learning, reinforcement learning (e.g., using Q-learning, using temporal difference learning), adversarial learning, and any other suitable learning style. Each engine or component of system 100 may additionally or alternatively implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, Gaussian process regression, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), LLAMA, LLAMA 2 (and subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein. It shall be noted that, in some embodiments, feature extraction engine 120 and/or activity identification engine 130 may not implement or employ machine learning algorithms or models.

1.4 Alert Generation Engine

The alert generation engine 140 may preferably function to generate one or more environment activity alerts based on one or more identified environment activities and/or one or more identified environment activity sequences. In various embodiments, alert generation engine 140 may function to generate environment activity alerts to provide information and/or notification(s) regarding one or more environment activities and/or activity sequences to one or more actors or entities in the target environment. In some embodiments, alert generation engine 140 may evaluate identified environment activities and/or environment activity sequences against one or more standard operating procedures (described in 2.4), and in turn alert generation engine 140 may function to trigger a generation of and/or a transmission of one or more environment activity alerts based on the evaluation. In some embodiments, alert generation engine 140 may function to generate one or more distinct types of environment activity alerts.

1.5 Alert Device and Instrument Control Module

The alert device and instrument control module 150 may preferably function to automatically control one or more alert devices or instruments based on generated environment activity alerts (as described in 2.4). In one or more embodiments, alert device control module 150 may function to generate and/or transmit one or more alert device control signals for each generated environment activity alert. In various embodiments, alert device and instrument control module 150 may function to control one or more alert devices including, but not limited to, one or more audio alert devices (e.g., speakers, sirens, buzzers, and/or the like), one or more visual alert devices (e.g., flashing lights, strobes, and/or the like), one or more electronic displays, one or more user devices, one or more wearable devices (e.g., display integrated into safety glasses), and/or any other suitable device for alerting or communicating an alert or notification.

Additionally, or alternatively, in some embodiments, the alert device and instrument control module 150 may generate control signals including, but not limited to, computer-executable instructions that modulate an operation of one or more instruments and/or machines (e.g., adjust the temperature setting for a stir plate or temperature stage, turn off or adjust the speed of a pump and/or or the like) in the activity environment being observed by the system 100. In one or more embodiments, the system 100 may additionally alert a human operator that the system 100 may be controlling the one or more instruments and/or machines. The environment data collection module 110 operating in operable communication with the alert device and instrument control module 150 may generate and/or provide a direct or indirect signal to the alert device and instrument control module 150 of a variable or device being controlled based on the data collected from the activity environment. As a non-limiting example, the environment data collection module 110 may provide an indirect visual indicator via a display of a wearable device or other device that may be accessible to a human operator. That is, in such example, unlike a thermostat which may control a temperature based on a temperature sensor readout (e.g., thermocouple), the system 100 may use a visual indicator of temperature, e.g., smoke, a visual appearance of boiling liquid, and/or an appearance of a reactant.

1.6 Data Repository

The data repository 160 may preferably function to receive, store, organize, and manage environment data, extracted activity feature data, environment activity data, and/or any other data or metadata generated and/or otherwise used by system 100 and/or one or more users or subscribers of system 100 or a service implementing system 100. In various embodiments, data repository 160 may be in operable communication with one or more components of system 100 to provide access to data stored in data repository 160 and/or to collect data from one or more components of system 100. In some embodiments, data repository 160 may include a plurality of data repositories 160. Additionally, or alternatively, in some embodiments, data repository 160 may include and/or be in operable communication with one or more remote data storage devices and/or remote data repositories (e.g., remote servers, cloud storage, and/or the like).

1A. System for Automatically Observing and Supervising Activities in an Environment As shown in FIG. 1A, a network 100A for automatically observing and supervising activities in an environment includes an experimentation anomaly detection service 102A, sensors 105A, and a user interface 150A.

1.01A Experimentation Anomaly Detection Service

Figure 1A:
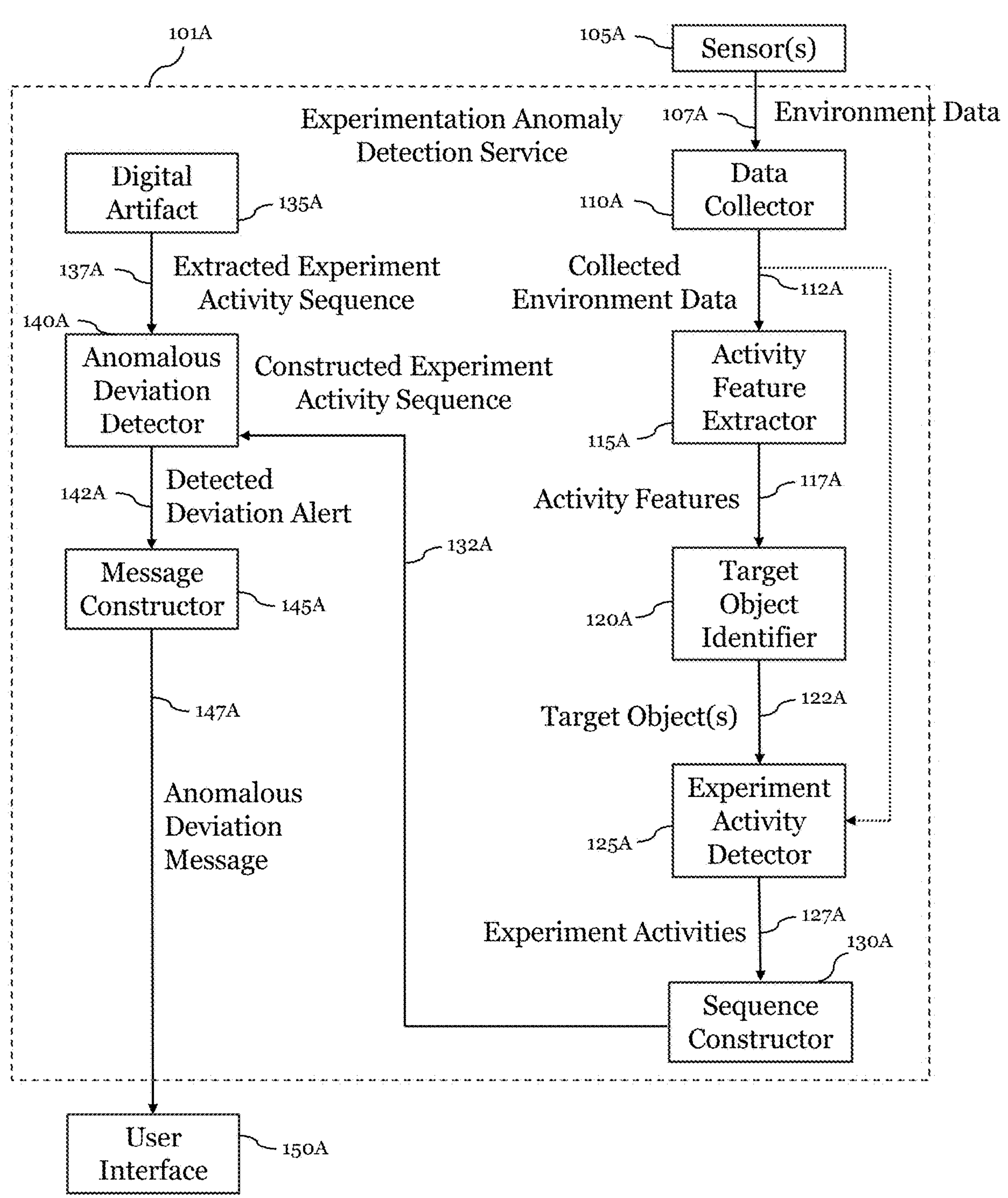
FIG. 1A illustrates a schematic representation of a network 100A in accordance with one or more embodiments of the present application.

As shown in FIG. 1A, the network 100A may include an experimentation anomaly detection service 101A. Experimentation anomaly detection service 101A may function to receive visual environment data 107A from sensor(s) 105A and to provide a message 147A indicating an anomalous deviation to user interface 150A based on the received visual environment data 107A. In some examples, experimentation anomaly detection service 101A may relate to one or more aspects of FIG. 1. For instance, experimentation anomaly detection service 101A may be an example of a system 100 as described with reference to FIG. 1.

In some examples, a "service" may be an example of a software application that is accessible over a network that may be configured to functionality to users via a web interface, an application programming interface (API), and/or a dedicated application. The experimentation anomaly detection service 101A may be an example of a service that is configured to receive information associated with an experiment from a user (e.g., environment visual data) and to provide information associated with detected anomalies to the user (e.g., one or more messages indicating detected anomalies and suggested actions to correct them).

1.05A Sensor(s)

As shown in FIG. 1A, the network 100A may include sensor(s) 105A. Sensor(s) 105A may be configured to collect visual environment data 107A from an experimentation workspace and to provide visual environment data 107A to experimentation anomaly detection service 101A (e.g., via data collector 110A). In some examples, each of sensor(s) 105A may relate to one or more aspects of FIG. 1. For instance, each of sensor(s) 105A may be an example of a sensor data source or a camera as described with reference to FIG. 1.

1.10A Data Collector

As shown in FIG. 1A, the experimentation anomaly detection service 101A may include a data collector 110A. Data collector 110A may be configured to collect, by one or more processors of experimentation anomaly detection service 101A, environment data 107A (e.g., visual environment data) from sensor(s) 105A and to provide collected environment data 112A to activity feature extractor 115A. In some examples, data collector 110A may relate to one or more aspects of FIG. 1. For instance, data collector 110A may be an example of an environment data collection module 110 as described with reference to FIG. 1.

1.15A Activity Feature Extractor

As shown in FIG. 1A, the experimentation anomaly detection service 101A may include an activity feature extractor 115A. The activity feature extractor 115A may be configured to extract, from the collected environment data 112A and by the one or more processors, a set of activity features 117A and to provide the set of activity features 117A to target object identifier 120A. In some examples, activity feature extractor 115A may relate to one or more aspects of FIG. 1. For instance, the one or more functionalities associated with activity feature extractor 115A may be implemented by feature extraction engine 120 as described with reference to FIG. 1.

1.20A Target Object Identifier

As shown in FIG. 1A, the experimentation anomaly detection service 101A may include a target object identifier 120A. The target object identifier 120A may be configured to identify, by the one or more processors and from the extracted set of activity features 117A, a set of target objects 122A and to provide the set of target objects 122A to experiment activity detector 125A. In some examples, target object identifier 120A may relate to one or more aspects of FIG. 1. For instance, the one or more functionalities associated with target object identifier 120A may be implemented by feature extraction engine 120 as described with reference to FIG. 1.

1.25A Experiment Activity Detector

As shown in FIG. 1A, the experimentation anomaly detection service 101A may include an experiment activity detector 125A. The experiment activity detector 125A may be configured to detect, by the one or more processors and using a machine learning model, an experiment activity 127A based on the identified set of target objects 122A and/or the collected environment data 112A and to provide the experiment activity 127A to sequence constructor 130A. In some examples, experiment activity detector 125A may relate to one or more aspects of FIG. 1. For instance, experiment activity detector 125A may be an example of activity identification engine 130 as described with reference to FIG. 1.

1.30A Sequence Constructor

As shown in FIG. 1A, the experimentation anomaly detection service 101A may include a sequence constructor 130A. The sequence constructor 130A may be configured to add, by the one or more processors, the experiment activity 127A to a sequence of experiment activities 132A constructed by the sequence constructor 130A and to provide the constructed sequence of experiment activities 132A to anomalous deviation detector 135A. In some examples, sequence constructor 130A may relate to one or more aspects of FIG. 1. For instance, the one or more functionalities associated with sequence constructor 130A may be implemented by alert generation engine 140 as described with reference to FIG. 1.

1.40A Anomalous Deviation Detector

As shown in FIG. 1A, the experimentation anomaly detection service 101A may include an anomalous deviation detector 140A. Anomalous deviation detector 140A may be configured to extract, by the one or more processors and from a digital artifact 135A, a sequence of experiment activities 137A. Additionally, anomalous deviation detector 140A may be configured to detect an anomalous deviation from the extracted sequence of experiment activities 137A based on the constructed sequence of experiment activities 132A. Anomalous deviation detector 140A may provide a detected deviation alert 142A to message transmitter 145A. In some examples, anomalous deviation detector 140A may relate to one or more aspects of FIG. 1. For instance, the one or more functionalities associated with anomalous deviation detector 140A may be implemented by alert generation engine 140 as described with reference to FIG. 1.

1.45A Message Constructor

As shown in FIG. 1A, the experimentation anomaly detection service 101A may include a message constructor 145A may be configured to generate, by the one or more processors, a message 147A indicating that the anomalous deviation has been detected based on one or more features of the anomalous deviation, thereby enabling a correction of anomalous deviation within the experimentation workspace. In some examples, message constructor 145A may relate to one or more aspects of FIG. 1. For instance, the one or more functionalities associated with message constructor 145A may be implemented by alert generation engine 140 and/or alert device and instrument control module 150 as described with reference to FIG. 1.

1.50A User Interface

As shown in FIG. 1A, the network 100A may include a user interface 150A. User interface 150A may be configured to display the message 147A indicated by the message transmitter 145A. In some examples, user interface 150A may relate to one or more aspects of FIG. 1. For instance, each of the one or more alert devices as described with reference to FIG. 1 may have a user interface 150A.

Figure 2:
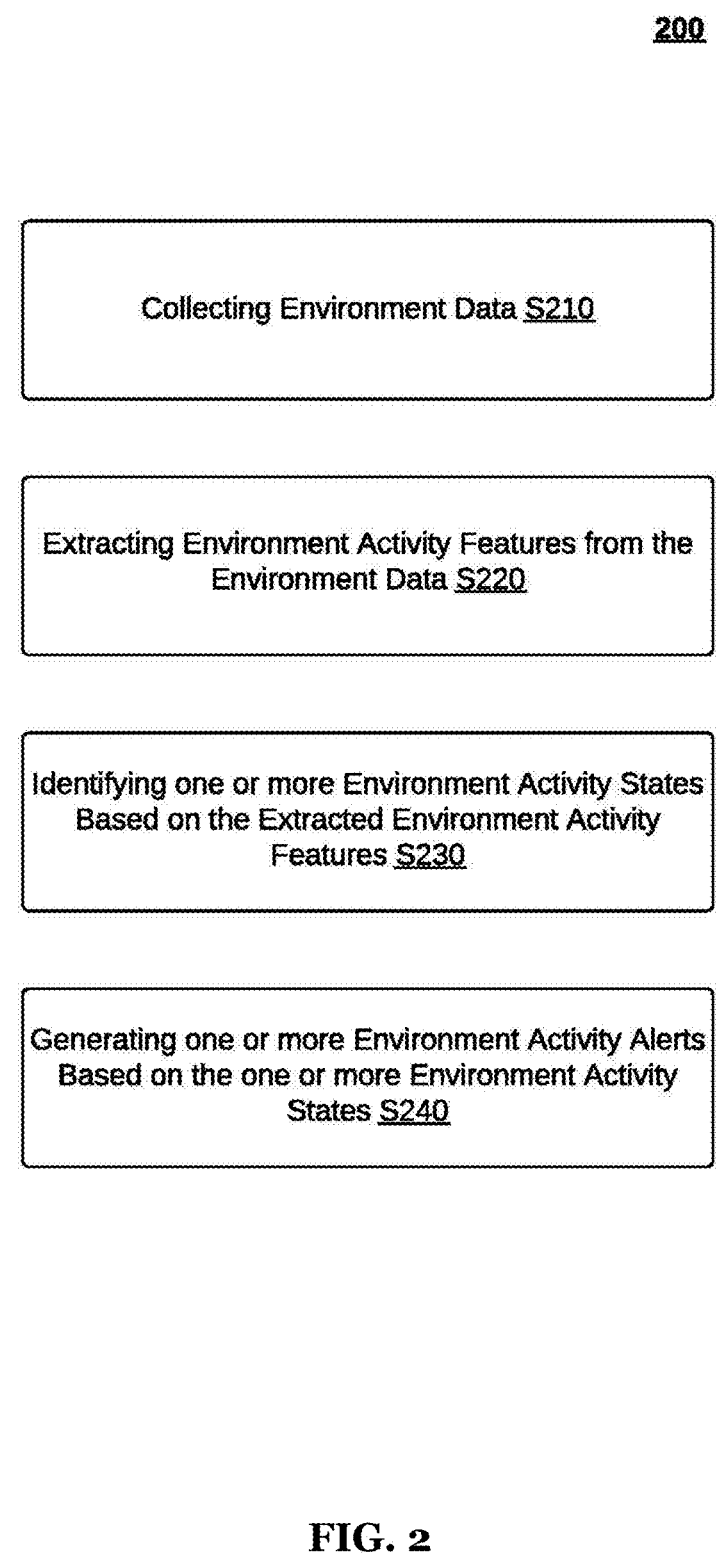

2. Method for Automatically Observing and Supervising Activities in an Environment As shown in FIG. 2, a method 200 for automatically observing and supervising activities in an environment includes collecting environment data S210, extracting environment activity features from the environment data S220, identifying one or more environment activity states based on the extracted environment activity features S230, and generating one or more environment activity alerts based on the one or more environment activity states S240.

2.1 Collecting Environment Data

S210, which includes collecting environment data, may function to collect or source environment data from one or more sensors, detectors, and/or other suitable sources or corpora of environment data. Environment data, as generally referred to herein, may relate to any data that may characterize, describe, and/or relate to a condition, property, or state of a target environment and/or an activity or task performed in the target environment. In various embodiments, the target environment, as generally referred to herein, may relate to an environment in which one or more tasks or procedures are executed or performed by one or more entities or actors. In one or more embodiments, the one or more entities or actors may interact with one or more instruments, apparatuses, and/or the like in the target environment to perform one or more activities or tasks. In some preferred embodiments, the target environment may be a laboratory environment, and S210 may function to collect environment data for one or more laboratory procedures or tasks (e.g., experiments) executed or performed by one or more entities or actors (e.g., experimenters, lab technicians, automated laboratory mechanisms, and/or the like).

In various embodiments, environment data may include, but is not limited to, data relating to one or more environment images (e.g., images from the target environment), environment video (e.g., video data from video of the target environment), environment audio (e.g., sound/audio data from the target environment), environment motion (e.g., motion detection data from the target environment and/or accelerometer data from the target environment), environment object or entity locations (e.g., proximity detection data for environment objects or entities, location data for environment object or entities, and/or the like), material and/or chemical composition data (e.g., chemical and/or material composition of air in the target environment, and/or one or more objects, entities, samples, and/or the like in the target environment), instrument data (e.g., data from one or more instruments in the target environment), and/or any other suitable data relating to a condition or state of the target environment.

Preferably, S210 may function to collect visual environment data (e.g., video data and/or image data) from one or more cameras arranged to capture visual environment data of the target environment. In some embodiments the one or more cameras may be arranged or installed in one or more locations of the target environment, as shown by way of example in FIG. 3. Additionally, or alternatively, in some embodiments one or more of the one or more cameras may be wearable cameras that may be attached to, mounted to, or otherwise located on one or more entities or actors performing one or more tasks in the target environment. In such embodiments, the one or more wearable cameras may change location during one or more activities performed in the target environment. In one or more embodiments, the quantity and/or arrangement of the one or more cameras may function to establish a complete field of view of one or more (or all) activities or tasks performed in the target environment, and/or all instruments or apparatuses that may be used to perform activities or tasks in the target environment. In some embodiments, one or more of the one or more cameras may include integrated microphones that may function to record and/or provide audio data from the target environment.

In some embodiments, S210 may function to collect environment data from one or more instruments or apparatuses in the environment. In various embodiments, environment data from one or more instruments or apparatuses may include weight or mass measurement data from one or more balances, scales, and/or the like, volume (e.g., liquid volume) data from one or more liquid measurement and/or delivery instruments (e.g., burettes, pipettes, and/or the like), barcode data that may be scanned from and/or associated with one or more instruments or apparatuses, and/or any other data from one or more instruments or apparatuses in the target environment.

In some embodiments, S210 may function to collect environment data input by one or more entities or actors in the target environment. In various embodiments, such input data may include, but is not limited to, text data (e.g., strings, characters, and/or any other suitable text-based data), one or more natural language utterances (e.g., text-based and/or audio-based natural language utterances), image and/or audiovisual data (e.g., images, audio files, videos, and/or the like transmitted, scanned, and/or otherwise input from one or more entities or actors), and/or any other suitable type of input data. In one or more embodiments, the one or more entities or actors in the target environment may input environment data via one or more input devices including, but not limited to, one or more computers, one or more user devices, one or more audio input devices (e.g., microphones), one or more visual or audiovisual input devices (e.g., scanners, cameras, and/or the like), and/or any other suitable data input device.

In some preferred embodiments, S210 may function to collect environment data from one or more sensors or detectors. In one or more embodiments, such sensors or detectors may include, but are not limited to, sound sensors (e.g., microphones, sound imaging devices, and/or the like), temperature sensors (e.g., ambient temperature sensors, thermocouples, infrared cameras, thermistors, thermometers, and/or the like), motion detectors (e.g., accelerometers, gyroscope sensors, ultrasonic motion detectors, infrared motion detectors, microwave motion detectors, acoustic motion detectors, video motion detectors, and/or the like), proximity detectors (e.g., infrared proximity sensors, ultrasonic proximity sensors, capacitive proximity sensors, inductance proximity sensors, radar sensors, magnetic proximity sensors, photoelectric proximity sensors, RFID sensors, laser proximity sensors, Hall effect sensors, and/or the like), gas sampler sensors (e.g., mass spectroscopic samplers, infrared gas sensors, gas chromatography sensors, PID detectors, electrochemical gas sensors, chemical absorption sensors, particulate samplers, general chemical sensors, and/or the like), location detectors (e.g., GPS sensors, WiFi positioning system sensors, radar sensors, sonar sensors, LiDAR sensors, indoor positioning systems, RFID sensors, and/or the like). In some embodiments, the one or more sensors or detectors may be arranged or installed in one or more locations in the target environment. Additionally, or alternatively, in some embodiments, one or more of the one or more sensors or detectors may be wearable sensors, detectors, and/or instruments that may be attached to, mounted to, or otherwise located on one or more entities or actors performing one or more tasks in the target environment. In such embodiments, the one or more wearable sensors, detectors, and/or instruments may change location during one or more activities performed in the target environment. In various embodiments, the quantity, type, and/or arrangement of sensors or detectors may function to establish a spatial coverage of the target environment such that the one or more sensors or detectors may provide environment data relating to one or more (or all) activities or tasks performed in the target environment. In various embodiments, the arrangement and/or configuration of cameras, sensors, detectors, and/or instruments in the target environment may be set to ensure complete and accurate collection of environment data.

In some embodiments, the one or more sensors or detectors may include and/or be included in one or more sensor arrays. A sensor array, as generally referred to herein, may relate to a collection or arrangement of one or more sensors or detectors that may function to collectively gather environment data from the target environment. In various embodiments, each sensor array may include any combination of one or more types of sensors or detectors. Additionally, or alternatively, in one or more embodiments, one or more sensor arrays may include one or more cameras to collect visual environment data.

In some embodiments, one or more of the one or more cameras, the one or more sensors or detectors, and/or the one or more sensor arrays may each include one or more communication devices or modules to transmit collected environment data. In various embodiments the one or more communication devices or modules may include, but are not limited to, one or more wireless communication modules (e.g., Wi-Fi modules, Bluetooth modules, Zigbee modules, and/or the like), one or more RF modules, one or more cellular modules, one or more ethernet modules, one or more serial communication modules, one or more fiber optic communication modules, one or more data ports (e.g., USB ports, HDMI ports, display ports, audio ports, camera ports, SD card slots, ethernet ports, and/or the like), and/or any other suitable communication device or module for transmitting environment data.

In some embodiments, one or more of the one or more cameras, the one or more sensors or detectors, and/or the one or more sensor arrays may each include or be associated with one or more storage devices or modules including, but not limited to, one or more SD or microSD cards and/or corresponding SD or microSD card slots, one or more USB flash drives, one or more hard drives, one or more solid-state drives, one or more network attached storage devices, flash memory, RAM, one or more microcontrollers with memory (e.g., microcontrollers with flash memory and/or RAM), and/or any other suitable storage device or module for storing environment data. Additionally, and/or alternatively, the one or more cameras, the one or more sensors or detectors, and/or the one or more sensor arrays may each be in communication with one or more remote storage devices for storing environment data.

2.2 Extracting Environment Activity Features from the Environment Data

S220, which includes extracting environment activity features from the environment data, may function to extract one or more environment activity features from the collected environment data that may relate to one or more conditions or states of one or more procedures, activities, tasks, and/or the like performed or executed in the target environment. In various embodiments, environment activity features, as generally referred to herein, may refer to data or data representations that may be associated with one or more patterns, structures, and/or information that may characterize or relate to one or more procedures, activities, tasks, and/or the like performed or executed in the target environment. In some embodiments, environment activity features may include and/or be stored as n-dimensional feature vectors. In some preferred embodiments, the environment activity features may include environment activity features extracted from visual environment data collected from one or more cameras in the target environment, as described in 2.1 above.

Extracting Activity Features from Visual Environment Data

In some preferred embodiments, S220 may function to extract activity features from visual environment data. In some such embodiments, S220 may function to implement a visual feature extraction model that may extract activity features from the visual environment data. A visual feature extraction model, as generally referred to herein, may relate to a machine learning model or algorithm (e.g., a convolutional neural network, a recurrent neural network, an algorithm for computing Inflated 3D ConvNet (I3D) or Optical Flow features and/or any other suitable machine learning model or algorithm, or combinations thereof), and/or an ensemble of machine learning models or algorithms, that may receive, as input, visual environment data and in turn produce, as output, one or more extracted activity features based on the input visual environment data. In one or more embodiments, the visual feature extraction model may function to output the extracted activity features as n-dimensional feature vectors that may relate to a numerical, vector-based representation of the corresponding extracted activity feature. In some embodiments, S220 may function to extract activity features that may enable identification and tracking of instruments, entities/actors, apparatuses, and/or any other objects in the target environment.

In some embodiments, S220 may function to implement frame-level feature extraction based on the collected visual environment data. In some such embodiments, S220 may function to pass or input one or more frames of collected visual environment data (e.g., video data) from one or more cameras in the target environment to the visual feature extraction model. In turn, the visual feature extraction model may function to output one or more visual or image-based activity features including, but not limited to, one or more identified edges, textures, colors, and/or boundaries in the input frame(s), one or more shapes, contours, and/or patterns in the input frame(s), one or more environment object parts and/or one or more environment objects and/or entities in the input frame(s), one or more environment object categories that may indicate or represent the presence of specific environment objects and/or entities in the input frame(s), semantic or descriptive information about the content of the image(s) in the input frame(s), and/or any other features (e.g., data) related to spatial patterns, structures, objects, entities, and/or the like that may be in the image(s) of the one or more input frames.

Additionally, or alternatively, in some embodiments, based on an input of one or more frames of collected visual environment data (e.g., video data) from one or more cameras in the target environment, the visual feature extraction model may function to output one or more object recognition features, entity recognition features, and/or any other image recognition feature(s) that may relate to or encode data or information related to the presence of specific identified objects, entities, and/or the like in the images of the one or more input frames. Accordingly, in such embodiments, S220 may function to identify the presence of specific identified objects, entities, and/or the like in the target environment based on the extraction of such recognition features.

Additionally, or alternatively, in some embodiments, based on an input of one or more frames of collected visual environment data (e.g., video data) from one or more cameras in the target environment, the visual feature extraction model may function to output one or more temporal features that may function to identify and/or characterize motion or motion patterns across the one or more input frames. Accordingly, in such embodiments, S220 may function to identify, track, and/or otherwise characterize motion of objects and/or entities in the target environment. Additionally, or alternatively, in such embodiments, S220 may function to identify, track, and/or otherwise characterize motion of the frame of reference of the source(s) of the one or more input frames (e.g., motion of one or more cameras from which the input frames are sourced).

Figure 4:
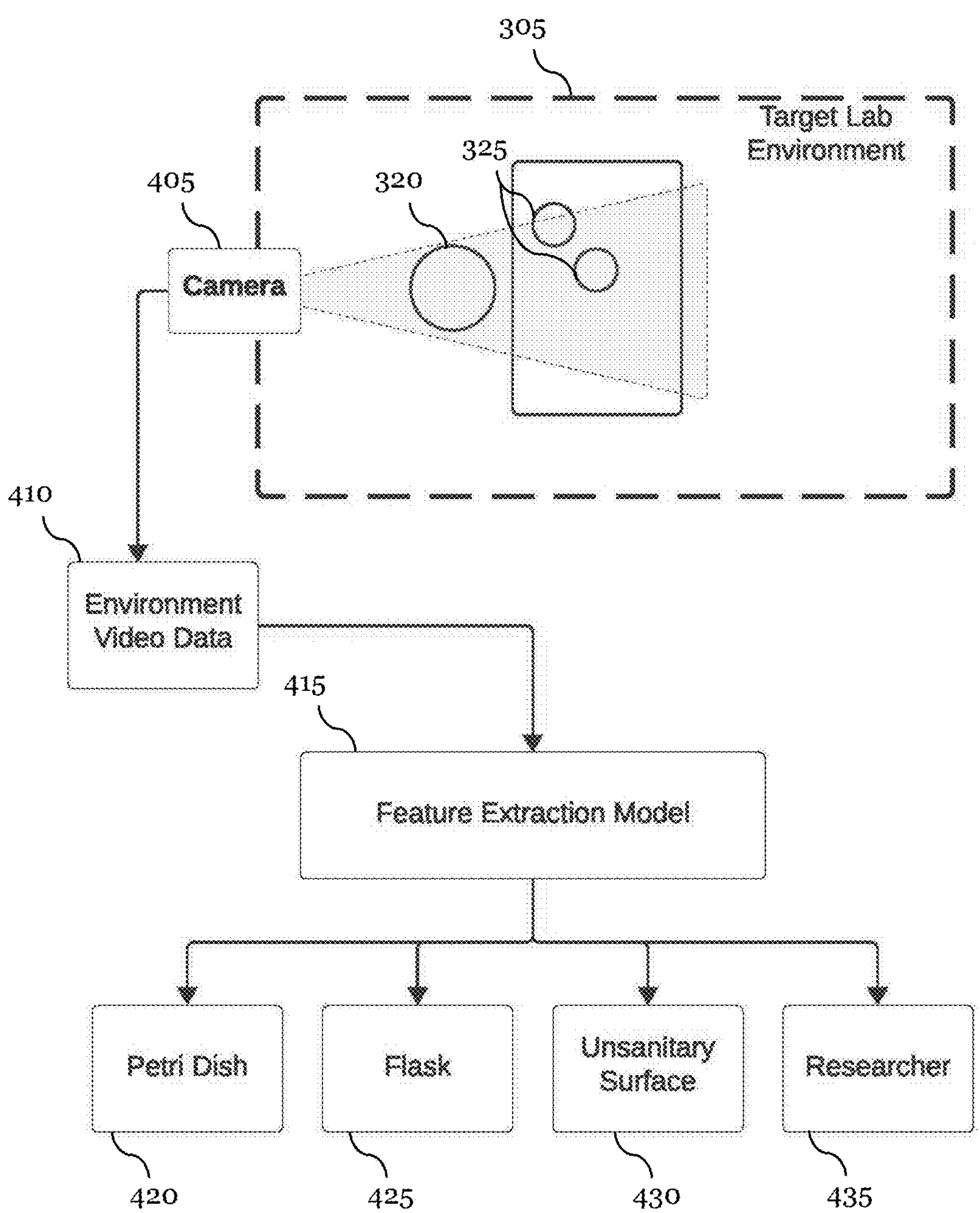
FIG. 4 illustrates a schematic representation of environment activity feature extraction in accordance with one or more embodiments of the present application.

As a non-limiting example, S220 may receive, as input, visual environment data that may include one or more videos of a laboratory environment, each of the one or more videos comprising video data (e.g., video frames) that show a petri dish, a flask, an unsanitary surface, and a researcher (entity/actor) inside the laboratory environment. In such a non-limiting example, as shown in FIG. 4, S220 may function to input the video data to the visual feature extraction model, and in turn the visual feature extraction model may function to output activity features corresponding to spatial regions for each of the petri dish, the flask, the unsanitary surface, and the researcher, such that S220 may function to localize each of the extracted features and track the objects between frames.

2.3 Identifying One or More Environment Activity States Based on the Extracted Environment Activity Features S230, which includes identifying one or more environment activity states based on the extracted environment activity features, may function to detect or identify one or more environment activity states associated with one or more environment activities of the target environment based on the extracted environment activity features. An environment activity state, as generally referred to herein, may relate to a state of a corresponding distinct environment activity that may be performed or executed in the target environment. An environment activity (sometimes referred to herein as an environment action) may relate to an action, task, or other activity that may be performed or executed in the target environment. In various embodiments, an environment activity state may include an activity classification or identifier (e.g., a label, name, title, and/or the like) of a corresponding action, task, or activity, as well as temporal data that may characterize the timing, duration, or other temporal aspects of the corresponding action, task, or activity (e.g., a start timestamp, a stop timestamp, a total activity duration, and/or the like).

Activity State Identification Model

In some embodiments, S230 may implement an activity state identification model that may function to detect, classify, or otherwise identify the one or more environment activity states and/or the one or more associated environment activities performed or executed in the target environment. In some embodiments, the activity state identification model may function to receive, as input, one or more pieces or segments of video (or audiovisual) environment data and/or one or more extracted environment activity features, and in turn the activity state identification model may function to compute and/or output one or more environment activity states based on the input features, as shown by way of example in FIG. 5. In one or more embodiments, the activity state identification model may include one or more algorithms and/or machine learning models. In various embodiments, the activity state identification model may include, but is not limited to, one or more hidden Markov models, one or more conditional random fields, one or more recurrent neural networks, one or more convolutional neural networks, one or more transformers, one or more methods for causal inference, and/or any other suitable model or algorithm for detecting, classifying, or otherwise identifying environment activity states and/or environment activities. It shall be noted that, in some embodiments, the activity state identification model may include an ensemble of models or algorithms including, but not limited to, the types of models or algorithms identified above and/or combinations thereof.

In some embodiments, the activity state identification model may be trained to identify one or more environment activity states and/or one or more environment activities. In some such embodiments, the activity state identification model may be trained based on an environment activity training corpus that may include one or more of: a set of one or more environment activity labels or strings associated with one or more environment activities that may be performed in the target environment, a set of one or more videos or images (e.g., video frames) sourced from one or more cameras or other image capturing devices, one or more environment activity features (e.g., I3D features, spatial features, temporal features) associated with the set of one or more videos or images (e.g., environment activity features extracted from the set of one or more videos or images), and a set of one or more environment activity annotations. In such embodiments, each environment activity annotation may include an environment activity label or string associated with a corresponding environment activity being performed at a distinct point in time and temporal data associated with the corresponding environment activity (e.g., a start timestamp indicating a start time for the corresponding environment activity, a stop timestamp indicating an end time for the corresponding environment activity, a duration of the corresponding environment activity, and/or the like).

In some embodiments, the training corpus for the activity state identification model may include one or more samples of video data. In some such embodiments, the one or more samples of video data may be segmented or clipped into one or more video segments based on an active video segment length. The active video segment length, as referred to herein, may relate to a duration or length of video segments (e.g., a 10 minute video segment length) that may define an optimal or desired length of a segment of video data that may be input to the activity state identification model. Additionally, in some such embodiments, each video segment may include or be associated with one or more environment activity labels that may identify or relate to one or more corresponding environment activities being performed or executed in that video segment.

In some embodiments, the training corpus may include only video segments that include visual data relating to one or more environment activities; that is, in some embodiments, the training corpus may selectively exclude video segments that may include only inactive periods (i.e., no environment activities performed) in the target environment. It shall be noted that, in various embodiments, the training corpus may additionally or alternatively include one or more video segments that may include both active and inactive periods (i.e., video segments that may include visual data relating to one or more environment activities only during part of the video segment), and/or one or more video segments that may include only inactive periods.

Additionally, or alternatively, in some embodiments, the activity state identification model may include an inactivity detection model. The inactivity detection model, as generally referred to herein, may relate to a model (e.g., a machine-learning model) or algorithm that may function to identify and or detect periods of inactivity in the target environment (i.e., time periods during which no environment activities are performed or executed) based on an input of visual environment data and/or extracted activity features. Accordingly, in some embodiments, the inactivity detection model may function to detect, identify, and/or predict periods of inactivity in the target environment. In such embodiments, the training corpus for the activity state identification model may include a sub-corpus for training the inactivity detection model. In such embodiments, the sub-corpus for training the inactivity detection model may include one or more videos, video segments, and/or images (e.g., video frames) that may include or be associated with one or more inactivity annotations or labels. In such embodiments, each distinct time period in the one or more videos, video segments, and/or images may be associated with an inactivity label if no environment activities are being performed or executed at that distinct time period. In some such embodiments, each video segment may be segmented from a sourced video or visual feed based on an inactive video segment length. The inactive video segment length, as referred to herein, may relate to a duration or length of video segments (e.g., an hour video segment length) that may define an optimal or desired length of a segment of video data that may be input to the inactivity detection model.

Temporal Sequences

In one or more embodiments, the activity state identification model may function to detect or identify a set of environment activity states of the target environment based on an input of one or more extracted environment activity features and/or video (or audiovisual) environment data. In some embodiments, each of the one or more sets of environment activity states may relate to one or more temporal sequences of one or more environment activities. A temporal sequence of environment activities, as generally referred to herein, may relate to a temporal or chronological sequence of one or more environment activities. In some such embodiments, a temporal sequence of environment activities may include or relate to a set of N environment activities that may occur in a distinct temporal or chronological order or sequence, where N is greater than or equal to one, as shown by way of example in FIG. 6. In some embodiments, one or more of the one or more environment activities of a temporal sequence may occur in a series (i.e., successively or sequentially at different points in time) and/or one or more of the one or more environment activities may occur in parallel (i.e., simultaneously or concurrently at the same time). It shall be noted that a temporal sequence may include environment activities that occur sequentially relative to one or more other environment activities in the temporal sequence, and concurrently relative to one or more other environment activities in the temporal sequence.

In some embodiments, the one or more environment activities and/or the temporal sequence of environment activities may relate to a distinct procedure or process performed or executed in the target environment. In such embodiments, the distinct procedure or process may include one or more steps that may relate to one or more environment activities performed or executed in the target environment. As a non-limiting example, a target environment may include a laboratory environment, and in such an example the one or more environment activities may relate to a specific experimental procedure performed or executed in the laboratory environment. In such an example, the temporal sequence may relate to a sequence of environment activities that may correspond to one or more steps of the experimental procedure.

Identifying Environment Activities|Real-Time

Preferably, S230 may function to detect, classify, and/or otherwise identify one or more environment activities or environment activity states. In one or more embodiments, S230 may function to identify, in real-time, one or more current environment activity states associated with one or more environment activities being currently or actively performed or executed, and/or having been recently performed or executed, in the target environment. In some preferred embodiments, S230 may function to provide, as input, video (or audiovisual) data and/or one or more extracted activity features from the collected environment data to the activity state identification model. In turn, the activity state identification model may function to compute or output an environment activity inference (sometimes referred to herein as an inference) of one or more environment activities and/or environment activity states that may relate to one or more environment activities performed or executed in the target environment based on the input video/audiovisual data and/or the input one or more extracted activity features. Accordingly, S230 may function to automatically identify one or more environment activities performed in the target environment based on visual/audiovisual data (e.g., video frames or segments) sourced from the target environment.

In some embodiments, the video/audiovisual data and/or one or more extracted activity features input to the activity state identification model may include video/audiovisual data and/or extracted activity features from the target environment in a specified or predefined time frame preceding the current time. That is, in some embodiments, the video data and/or the one or more extracted activity features may represent or relate to a state of the target environment from a time T-X to T, where Tis the current time and X is the specified or predefined time frame, and X is greater than zero. As a non-limiting example, with a predefined time frame X of ten minutes, the video data may include the last ten minutes of video data from the target environment. Additionally, or alternatively, in some embodiments, S230 may function to input video/audiovisual data and/or one or more extracted activity features to the activity state identification model in real time or instantaneously, such that the activity state identification model may process a real-time status of the target environment.

In one or more embodiments, an inference of the one or more environment activities and/or environment activity states output by the activity state identification model may include one or more environment activity identifiers (labels, names, titles, and/or the like) that may relate to one or more predicted or identified environment activities. In some such embodiments, the one or more environment activity identifiers may be predefined and/or system recognized environment activity identifiers, such that the activity state identification model may function to classify each identified environment activity with a corresponding environment activity identifier. The inference may additionally include a confidence score for the predicted one or more environment activity identifiers that may indicate a certainty or confidence in the inference computed by the activity state identification model.

In some embodiments, S230 may function to identify one or more environment activities and/or environment activity states based on video (or audiovisual) data and/or one or more extracted activity features from such video data sourced from a plurality of cameras or other sources of video data in the target environment (e.g., a plurality of cameras located or arranged in the target environment as described in S210). In such embodiments, S230 may function to input the video data from the plurality of cameras into the activity state identification model, and in turn the activity state identification model may compute a distinct environment activity inference for each source of video data (e.g., each camera). In such embodiments, the computed environment activity inferences may exhibit a degree of disagreement such that the computed inferences may not be the same for a given environment activity; that is, in such embodiments, the activity state identification model may compute one or more different environment activity inferences for a distinct environment activity based on which camera the input data is sourced from. In such embodiments, S230 may function to ensemble or aggregate each computed environment activity inference based on one or more inference ensemble techniques such that S230 may function to identify a probable or likely environment activity inference for the current environment activity. In a first implementation, S230 may function to implement a query by committee ensemble technique to compute a distinct environment activity inference for each distinct environment activity. Alternatively, in a second implementation, S230 may function to ensemble probabilistic predictions over discrete environment activities provided by each of the plurality of cameras or video data sources.

As a non-limiting example in which the target environment is a laboratory environment, S230 may function to detect or identify one or more environment activities that may relate to one or more experiments or procedures that may be performed in the laboratory. In such an example, an entity or actor (e.g., an experimenter) in the laboratory may hold a pipette as a step or action in an experiment or procedure. In such an example, S230 may function to provide video data of the entity or actor holding the pipette and/or one or more extracted activity features from such video data to the activity state identification model. In such an example, the one or more predefined or system recognized environment activity identifiers may include an identifier (label) of "hold_pipette" that may relate to the environment activity of holding a pipette. In turn, the activity state identification model may function to compute or output an inference including an environment activity identifier of "hold_pipette" based on the input video data that may indicate that the environment activity of holding a pipette is being (or has been) performed in the target environment. Accordingly, in such an example, S230 may function to automatically detect or identify one or more environment activities that may be performed or executed in an experiment or procedure occurring in the target laboratory environment.

Identifying Environment Activities|Post-Procedure

In some embodiments, S230 additionally or alternatively function to detect, classify, and/or otherwise identify one or more environment activities or environment activity states in a post-procedure or post-active state of the target environment; that is, S230 may function to identify one or more environment activities or environment activity states of a procedure or process after that procedure or process has been completed in the target environment. In such embodiments, S230 may function to implement the inactivity detection model to identify active and inactive time periods in historical video (or audiovisual) data of the procedure or process that was performed in the target environment. In one or more embodiments, S230 may in turn separate historical the video (or audiovisual) data of the process or procedure from the target environment into one or more active and/or inactive video data segments (sometimes referred to herein as video segments) that may relate to active periods (i.e., time periods in which one or more environment activities are being performed or executed) and inactive periods (i.e., time periods in which no environment activities are being performed or executed) in the target environment. In such embodiments, S230 may further divide or segment active video data segments into video data chunks (sometimes referred to herein as video chunks) based on a predetermined or predefined maximum active video segment duration (e.g., a maximum time duration or time length of for each video segment) such that each active video data segment or chunk may include video data with a duration of less than or equal to the maximum active video segment duration. As a non-limiting example, the maximum active video segment duration may be 10 minutes, such that each active video data segment may be divided into chunks of 10 minutes or less in duration.

In some embodiments, each active video data chunk may include two overlap periods of a predetermined overlap period duration at a beginning and end of each active video data chunk. In such embodiments, the overlap periods of each active video chunk may include video that be included in (i.e., overlap with) one or more other active video chunks, and/or the overlap periods may be predicted to have been inactive by the inactivity detection model. In such embodiments, each active video chunk may include a central or middle period between the beginning and end overlap periods. In such embodiments, with a maximum active video segment duration of Y and overlap period duration of Z, each central or middle period of each active video chunk may have a duration less than or equal to $Y-2Z$. As a non-limiting example, S230 may function with a maximum active video segment duration of 10 minutes and a predetermined overlap period duration of one minute. In such an example, each active video chunk may have a central or middle period of a duration less than or equal to eight minutes.

In one or more embodiments, S230 may function to implement the activity state identification model to compute one or more environment activity inferences and/or one or more environment activity states of a completed procedure or process based on an input of each of the one or more active video chunks and/or one or more extracted activity features from each active video chunk. In such embodiments, the activity state identification model may function in a similar fashion as described above for real-time identification of environment activities and environment activity states. Accordingly, S230 may function to automatically identify the one or more environment activities and/or the one or more environment activities of a procedure or process that has been completed in the target environment based on inputs of historical video (or audiovisual) data and/or historical extracted activity features to the activity state identification model. In some embodiments, S230 may function to collate or aggregate environment activity inferences from the activity state identification model for each active video chunk, such that, based on the computed inferences, S230 may function to output a set or sequence of one or more environment activities or environment activity states that may characterize the process or procedure that was performed in the target environment.

Detecting Temporal Boundaries

In one or more embodiments, S230 may function to identify temporal data for the one or more identified environment activities and/or environment activity states. In some such embodiments, S230 (e.g., via the activity state identification model) may function to identify temporal boundaries between different identified environment activities in a temporal sequence that may indicate transitions between different environment activities. In such embodiments, the identified temporal boundaries may correspond to start and stop times for corresponding environment activities. In some such embodiments, as shown by way of example in FIG. 5, S230 may function to update corresponding environment activity states with temporal data (e.g., start timestamps and end timestamps) based on the identified temporal boundaries. In some embodiments, S230 may function to update and/or construct an environment activity state for each identified environment activity that may include the corresponding environment activity label of the output activity state identification model inference, a start timestamp based on the identified temporal boundaries, and an end timestamp based on the temporal boundaries.

As a non-limiting example in which the target environment is a laboratory environment, an experimenter may perform the environment activities of picking up a pipette, then holding the pipette, and then sterilizing the pipette in a sequence (i.e., a temporal sequence of environment activities). In such an example, S230 may input video data and/or activity features extracted from the video data of the experimenter performing the sequence of environment activities into the activity state identification model, which in turn may function to output three distinct activity inferences including three respective environment activity labels (e.g., pick_up_pipette, hold_pipette, sterilize_pipette) corresponding to the three activities performed by the experimenter. In such an example, the activity state identification model may function to compute or determine temporal boundaries between the identified environment activities (e.g., via timestamps in the video data) that may correspond to start times and end times for each identified environment activity. In such an example, S230 may function to update, associate, or add temporal data to each identified environment activity. In some embodiments of such an example, S230 may function to update and/or construct an environment activity state for each identified environment activity that may include the corresponding inference label (e.g., pick_up_pipette, hold_pipette, sterilize_pipette) as well as start timestamps and end timestamps that may be identified by the temporal boundaries.

Environment Activity Log

In some embodiments, S230 may function to construct and/or modify an environment activity log based on the identified environment activities or environment activity states. An environment activity log, as generally referred to herein, may relate to a data object or data structure that may include or store a list of one or more environment activities that may have been performed or executed in the target environment. In some such embodiments, the environment activity log may store a list of environment activity identifiers (e.g., identifiers computed by the activity state identification model). In some embodiments, an environment activity log may be associated with a distinct target procedure. A target procedure, as generally referred to herein, may relate to a set of one or more related environment activities performed in the target environment. In some embodiments, a target procedure may include one or more related environment activities performed in a distinct temporal sequence. In some embodiments, S230 may function to store or output the constructed environment activity log to one or more local and/or remote storage devices or repositories. In one or more embodiments, S230 may function to transmit or output the constructed environment activity log to one or more users or subscribers of a system implementing method 200 (e.g., via a user interface, one or more user devices, and/or any other suitable means to transmit or output the environment activity log).

2.4 Generating One or More Environment Activity Alerts Based on the One or More Environment Activity States S240, which includes generating one or more environment activity alerts based on the one or more environment activity states, may function to generate and output one or more environment activity alerts that may function to alert or notify one or more entities or actors of one or more identified environment activities and/or one or more conditions of the target environment. In one or more embodiments, an environment activity alert may include alert descriptive data that may relate to, describe, and/or otherwise characterize the environment activity alert. In some embodiments, one or more environment activity alerts may additionally or alternatively include one or more control signals that may function to activate or control one or more alert output devices to output one or more generated environment activity alerts. Additionally, in various embodiments, S240 may function to generate one or more different types of environment activity alerts based on evaluating the one or more identified environment activity states.

Standard Operating Procedure Artifact

In one or more embodiments, S240 may function to source, identify, and/or receive input including a standard operating procedure artifact. A standard operating procedure artifact, as referred to herein, may refer to a data structure that may include data relating to a standard or intended sequence of steps (environment activities) in a target procedure that may be performed or executed in the target environment. In such embodiments, the standard operating procedure artifact may define a set of one or more environment activities for the target procedure, and/or a temporal sequence of environment activities for the target procedure. In some embodiments, the standard operating procedure artifact may include a list of one or more environment activity identifiers that may correspond to the set of one or more environment activities of the target procedure. In some such embodiments, the order of the list may relate to the temporal sequence of the target procedure (e.g., a first environment activity identifier of the list may correspond to a first chronological environment activity of the target procedure, a second environment activity identifier of the list may correspond to a second chronological environment activity of the target procedure, etc.). Additionally, or alternatively, each environment activity identifier may be associated with a sequence position (e.g., ordinal numbers) that may identify or define the position or order of the corresponding environment activity in the temporal sequence of the target procedure. In one or more embodiments, S240 may function to implement a user interface that may enable one or more users or subscribers to provide input that may include the standard operating procedure artifact.

Environment Activity Alerts|Procedure Deviation

In one or more embodiments, S240 may function to generate one or more procedure deviation environment activity alerts based on detecting a deviation from a standard operating procedure. A procedure deviation environment activity alert (sometimes referred to herein as a procedure deviation alert), as referred to herein, may relate to an environment activity alert that may function to inform or notify one or more entities or actors that a deviation from the standard operating procedure has been detected. In such embodiments, S240 may function to periodically and/or continuously monitor identified environment activities and/or identified environment activity states (e.g., environment activity inferences output by the activity state identification model). In some such embodiments, S240 may compare or evaluate the identified environment activities or activity states against the standard operating procedure artifact that may define a standard or desired sequence of environment activities or activity states. In some such embodiments, S240 may function to evaluate the sequence of identified environment activities against the standard operating procedure sequence based on comparing the environment activity identifiers associated with the identified environment activities (e.g., the identifiers of the computed activity inferences described in 2.3) with one or more environment activity identifiers defined or otherwise included in the standard operating procedure sequence.

Figure 7:
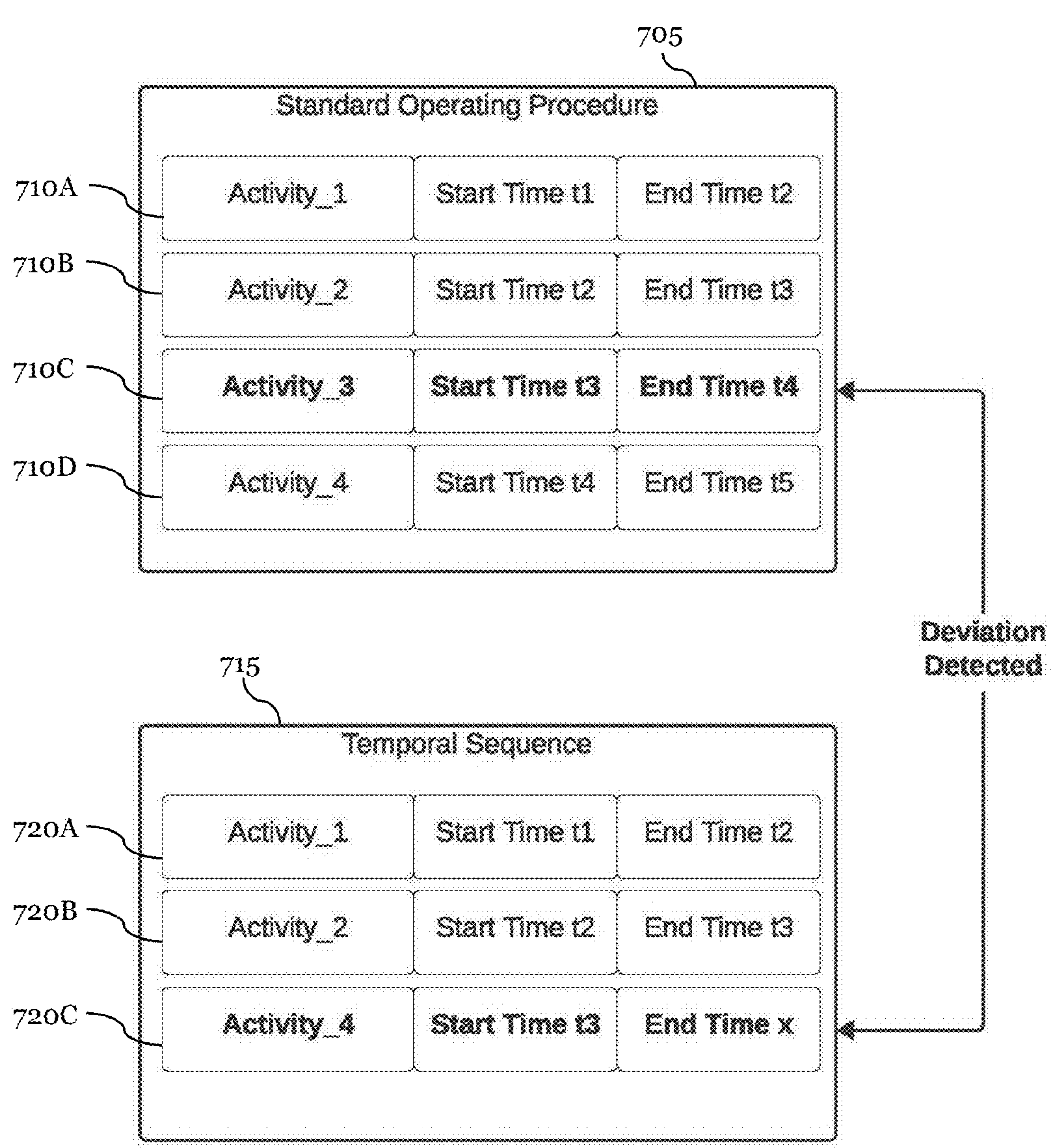
FIG. 7 illustrates a schematic representation of a detection of deviation from a standard operating procedure sequence in accordance with one or more embodiments of the present application.

In one or more embodiments, S240 may evaluate a sequence of identified environment activities (e.g., a temporal sequence of environment activities as described in 2.3) against the standard operating procedure sequence to detect any deviation from the standard operating procedure sequence, as shown by way of example in FIG. 7. In various embodiments, a deviation from the standard operating procedure sequence may relate to an environment activity of the standard operating procedure sequence that may not have been performed (e.g., a procedure step that may have been skipped or missed), an identified environment activity that does not match any environment activity of the standard operating procedure (e.g., a procedure step that was identified as having been performed but is not part of the standard operating procedure), an identified environment activity that should not have been performed at a distinct point in time according to the standard operating procedure sequence (e.g., a procedure step that was identified as having been performed too early and/or too late), and/or any other deviation of the identified environment activities from the standard operating procedure. In one or more embodiments, if a deviation from the standard operating procedure sequence is detected or identified, S240 may function to automatically generate one or more procedure deviation environment activity alerts. In some embodiments, S240 may function to automatically trigger a generation of one or more procedure deviation environment activity alerts based on detection of one or more deviations from the standard operating procedure.

In various embodiments, alert descriptive data of a procedure deviation alert may include a name or identifier of one or more environment activities that should have been performed (e.g., in a case of one or more missed or skipped procedure steps), a name or identifier of one or more environment activities that should not have been performed (e.g., in a case of one or more identified environment activities that do not match activities of the standard operating procedure and/or should not have been performed at that point in time according to the sequence of activities defined by the standard operating procedure), temporal data relating to the detected deviation (e.g., a timestamp that may indicate a time of the detected deviation), and/or any other suitable data or metadata descriptive of or relating to a detected deviation.

Environment Activity Alerts|Procedure Sequence Guidance

In one or more embodiments, S240 may function to generate one or more procedure sequence guidance environment activity alerts (sometimes referred to herein as a procedure guidance alert) based on identifying a sequence of environment activities or environment activity states in a target procedure. A procedure sequence guidance environment activity alert, as generally referred to herein, may relate to an environment activity alert that may function to inform or notify one or more entities or actors in the target environment of one or more subsequent steps (environment activities) in the target procedure. That is, a procedure guidance alert may function to identify and communicate the next steps in a target procedure currently being performed or executed by the one or more entities or actors in the target environment. In one or more embodiments, S240 may function to periodically and/or continuously monitor identified environment activities and/or identified environment activity states (e.g., environment activity inferences output by the activity state identification model). In some embodiments, S240 may function to evaluate or compare the identified activities that have been performed and/or are currently being performed in the target procedure against the sequence of environment activities of the standard operating procedure artifact. In such embodiments, S240 may function to identify the current position of the target procedure in the sequence of the standard operating procedure artifact, and in turn S240 may function to identify one or more subsequent environment activities that should be performed next.

In some embodiments, S240 may generate and/or output a procedure guidance alert in response to identifying one or more subsequent environment activities to be performed or executed after one or more environment activities that may be currently performed or executed, and/or one or more environment activities that have been performed or executed immediately prior to a current time. Additionally, or alternatively, in some embodiments, S240 may generate and/or output a procedure guidance alert in response to receiving a query from one or more users or subscribers for information relating to one or more subsequent environment activities. In various embodiments, alert descriptive data of a procedure guidance alert may include a name or identifier of each of the one or more subsequent environment activities that should be performed next according to the evaluation of the standard operating procedure artifact.

Environment Activity Alerts|Alert Devices

In some embodiments, S240 may function to generate and/or transmit one or more control signals to activate or control one or more activity alert devices. An activity alert device, as generally referred to herein, may relate to a device that may be activated to deliver or output an environment activity alert to one or more entities or actors in the target environment, and/or one or more users or subscribers of a system or service implementing method 200. In various embodiments, activity alert devices may include, but not limited to, one or more audio alert devices (e.g., speakers, sirens, buzzers, and/or the like), one or more visual alert devices (e.g., flashing lights, strobes, and/or the like), one or more electronic displays, one or more graphical user interfaces, one or more user devices, and/or any other suitable device for alerting or communicating an alert or notification. In some embodiments, S240 may function to automatically transmit one or more control signals to activate one or more alert devices in response to generating a corresponding environment activity alert.

In some embodiments, S240 may function to transmit alert descriptive data of a corresponding environment activity alert to the one or more alert devices. In some such embodiments, the one or more alert devices may output the alert descriptive data of the corresponding environment activity alert to the one or more entities or actors in the target environment. In such embodiments, S240 may function to implement a language model (e.g., a large language model and/or a natural language model) that may provide a natural language output of the alert descriptive data, such that the one or more entities or actors may readily understand the alert descriptive data. Additionally, or alternatively, in some embodiments, S240 may function to transmit only an activation and/or deactivation control signal to one or more alert devices that may activate and/or deactivate an alert device (e.g., activate and/or deactivate a flashing light).

As a non-limiting example, in response to generating a procedure guidance alert, S240 may function to transmit alert descriptive data of one or more subsequent environment activities to a speaker in a natural language format. In turn, the speaker may output the one or more subsequent environment activities to one or more entities or actors in the target environment (e.g., by listing the subsequent environment activities via voice output).

As another non-limiting example, in response to generating a procedure deviation alert, S240 may function to transmit an alert device control signal that may activate a flashing light in the target environment. In such an example, the flashing light may indicate to one or more entities or actors in the target environment that a deviation from the standard operating procedure for the target procedure may have occurred.

Environment Activity Alerts|Instrument Control

In some embodiments, S240 may additionally or alternatively function to generate one or more instrument control signals that may include computer-executable instructions that modulate an operation of one or more instruments and/or machines in the target environment. In such embodiments, the one or more instrument control signals may include, but are not limited to, control signals to activate one or more instruments and/or machines in the target environment (e.g., activate a light, activate a fan, and/or any other activation of instruments or machines in the target environment), control signals to deactivate one or more instruments and/or machines in the target environment (e.g., turn off a hot plate, turn off the flow of liquid and/or any other deactivation of instruments or machines in the target environment), and/or control signals to otherwise adjust or modulate an operation of one or more instruments and/or machines in the target environment (e.g., adjust the temperature setting for a stir plate or temperature stage, adjust the speed of a pump, control the rate at which a reagent is added, and/or any other modulation of instruments or machines in the target environment). In some embodiments, S240 may function to generate the one or more instrument control signals in response to identifying one or more activity alerts (e.g., a procedure deviation activity alert).

In some embodiments, S240 may function to automatically modulate an activity of one or more instruments and/or machines based on automatically transmitting the one or more generated instrument control signals to the one or more instruments and/or machines. In some such embodiments, S240 may function to automatically transmit the one or more generated instrument control signals once the instrument control signals are generated. Additionally, or alternatively, in some embodiments S240 may function to query one or more users or operators to confirm an intent to modulate the one or more instruments and/or machines before transmitting the one or more generated instrument control signals. In some embodiments, S240 may additionally function to generate one or more instrument control alerts based on generating or transmitting the one or more instrument control signals. An instrument control alert may relate to an alert that may function to notify one or more entities or actors (e.g., a human operator of a machine and/or instrument) that one or more instrument control signals may be controlling or modulating an instrument and/or machine in the target environment.

2A. Method for Automatically Observing and Supervising Activities in an Environment As shown in FIG. 2A, a method 200A for automatically observing and supervising activities in an environment includes extracting, from a digital artifact, a first sequence of experiment activities; constructing a second sequence of experiment sequence; detecting an anomalous deviation from the first sequence based on the second sequence; and providing, to a user interface, a message indicating the anomalous deviation has been detected. In some examples, method 200A may be performed at an experimentation anomaly detection service as described herein.

It shall be appreciated that other embodiments contemplated within the scope of the present disclosure may involve more processes, fewer processes, different processes, or a different order of processes than illustrated in FIG. 2A. It should be noted that a computer-program product may include a non-transitory machine-readable storage medium storing computer instructions that, when executed by one or more operations, may perform operations corresponding to the processes and sub-processes of method 200A. Additionally, or alternatively, a computer-implemented method may include operations corresponding to processes and sub-processes of 200A. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 200A.

One of ordinary skill in the art will appreciate that method 200A may provide many technical advantages and practical applications over other techniques. For instance, existing techniques for detecting errors associated with performing experiment activities in an experimentation workspace (e.g., a laboratory) may occur post-experiment and may involve manual review and troubleshooting. The techniques described herein, meanwhile, may use real-time error detection to detect when experiment activities performed by a user (e.g., a researcher, an experimentalist, a clinician) deviate from a standard operating procedure and may provide suggested corrective actions to the user to resolve these deviations. For instance, the techniques described herein may identify anomalies such as carried-over droplets or incorrect microplate well interactions and may alert the user of the anomalies as well as actions to take to correct these anomalies. The real-time capability reduces wasted resources, ensures the integrity of experiments, and enhances the efficiency of laboratory workflows.

Additionally, or alternatively, other tracking systems may rely on 2D imaging, which may fail to account for spatial ambiguities and misalignment errors. The techniques described herein, meanwhile, may utilize depth sensing and/or clustering algorithms that may enable 3D localization of targets, such as pipettes and well plates. For instance, the utilization of depth data may enable the tracking system described herein to confirm that a pipette is correctly aligned with a specific well of a microplate, ensuring proper dispensing or aspiration of fluids (e.g., reagents). Such capability reduces errors like cross-contamination or misplacement and enhances overall reliability and reproducibility of experiments.

Additionally, or alternatively, other tracking systems may lack intuitive interfaces that cater to real-time tracking and error correction. The techniques described herein employ a dynamic graphical user interface (GUI) that may provide users with real-time visual feedback on tool positions, procedural progress, and errors. For example, users may see a pipette's movement across a well plate, with wells changing colors to indicate completed and pending steps. Post-procedure, the system may enable users to replay experiments, search for specific experiment activities, and diagnose issues. These capabilities may enhance procedural accuracy and may offer both usability and advanced functionality.

2.1A Extracting a First Sequence of Experiment Activities from a Digital Artifact S210A, which includes extracting by one or more processors a first sequence of experiment activities from a digital artifact, may function to provide an expected sequence of tasks to perform in order to perform an experiment procedure. For instance, S210A may extract, from a digital artifact, a first sequence of experiment activities for a target experiment procedure. A "digital artifact" may refer to a standard operating procedure artifact, where the standard operating procedure artifact may be a data structure that includes data relating to a standard or intended sequence of steps (environment activities) in a target procedure that may be performed or executed in a target environment. A "sequence of experiment activities" may refer to the intended sequence of steps in the target procedure associated with the digital artifact. An "experiment activity" may refer to an environment activity that is associated with a task related to an experiment. A "target experiment procedure" may refer to a target procedure in which the associated sequence of steps is performed to complete an experiment. An "experiment" may refer to a controlled procedure performed in order to obtain data, such as a measurement.

Extracting the first sequence of experiment activities from the digital artifact may include retrieving the digital artifact from a source. The source may, for instance, include a database or memory accessible by the experimentation anomaly detection service. Additionally, or alternatively, the source may be a server or a software application accessible via an application programming interface (API). Upon retrieving the digital artifact from the source, the experimentation anomaly detection service may process the digital artifact in order to retrieve the first sequence of experiment activities (e.g., perform text, image processing, audio processing, or video processing on the digital artifact). In some examples, the processing may utilize a machine learning model (e.g., the digital artifact may be provided to a machine learning model that may provide the first sequence of experiment activities).

In a non-limiting example, FIG. 7 may depict a first experiment activity sequence 705 (e.g., a first sequence of experiment activities), where the first experiment activity sequence 705 may correspond to a standard operating procedure. For instance, first experiment activity sequence 705 may include first experimental activity 710A, second experiment activity 710B, third experiment activity 710C, and fourth experiment activity 710D. The experiments of the first experiment activity sequence 705 may be ordered chronologically. For instance, in the first experiment activity sequence 705, first experiment activity 710A may have an earliest start time, second experiment activity 710B may have a next earliest start time, third experiment activity 710C may have a next earliest start time, and fourth experiment activity 710D may have a latest start time. Additionally, or alternatively, in the first experiment activity sequence 705, first experiment activity 710A may have an earliest end time, second experiment activity 710B may have a next earliest end time, third experiment activity 710C may have a next earliest end time, and fourth experiment activity 710D may have a latest end time.

2.2A Constructing a Second Sequence of Experiment Activities from Sensor(s)

S220A, which includes constructing by the one or more processors a second sequence of experiment activities based on data collected from one or more sensors, may function to provide an actual sequence of tasks performed during the experiment.

Collection of Environment Data from Sensors

As part of constructing the second sequence of experiment activities, S220A may collect, at each timepoint of a set of timepoints and via one or more sensors, environment data from an experimentation workspace. A "timepoint" may refer to a single static image that captures environment data from the experimentation workspace at a single instance of time or over a particular interval, where each timepoint of the set of timepoints may be at least partially non-overlapping with each other timepoint of the set of timepoints. An example of a timepoint may be a frame. A "sensor" may refer to a sensing device or a camera configured to receive environment data. The term "environment data" may refer to data collected from a physical environment (e.g., visual environment data such as video data and/or image data). An "experimentation workspace" may refer to an environment (e.g., an enclosed environment) in which an experiment is carried out.

The environment data may further include depth information, where "depth information" may refer to data that represents the distance of a location relative to the one or more sensors. For instance, the one or more sensors may be configured to sense depth (e.g., may be three-dimensional (3D) depth-sensing cameras). Such depth information may enable the experimentation anomaly detection service to determine how far a location within the experimentation workspace is from each of the one or more sensors.

Figure 3:
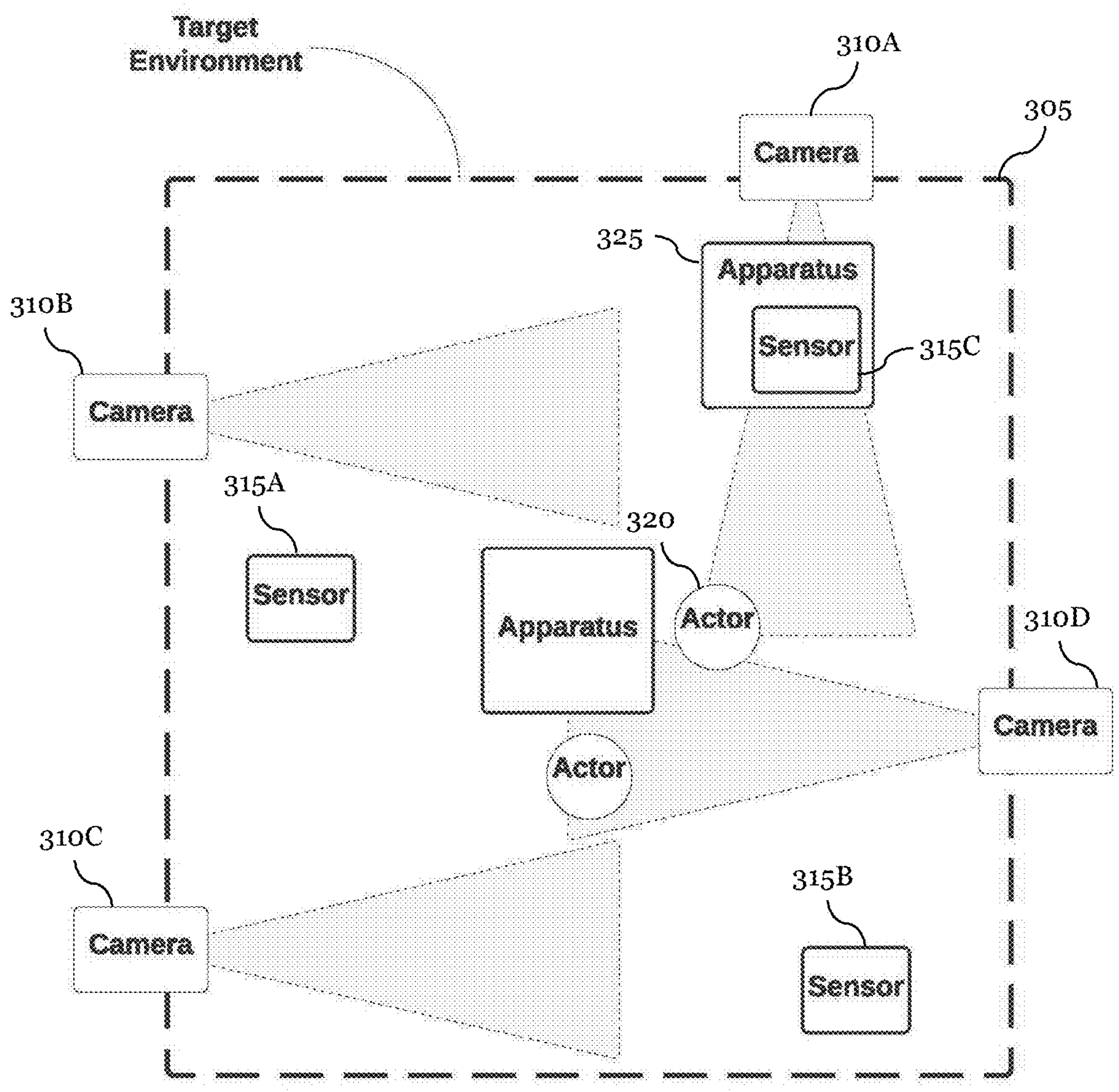
FIG. 3 illustrates a schematic representation of a target environment in accordance with one or more embodiments of the present application.

In a non-limiting example, as depicted with reference to FIGS. 3 and 4, target environment 305 may include cameras 310A, 310B, 310C, and 310D as well as sensors 315A, 315B, and 315C. Target environment 305 may be an experimentation workspace and cameras 310A, 310B, 310C, and 310D as well as sensors 315A, 315B, and 315C may be examples of sensors configured to collect environment data. As depicted in FIG. 4, camera 405 may be configured to collect environment video data 410 (e.g., environment data) associated with an actor 320 and one or more apparatuses 325 within target environment 305 (e.g., which may be an example of a target lab environment). Camera 405 may provide the environment video data 410 to feature extraction model 415.

Extraction of Activity Features from Environment Data

As part of constructing the second sequence of experiment activities, S220A may extract, from the collected environment data, a set of activity features. The term "activity features", as described herein may refer to data or data representations that may be associated with one or more patterns, structures, and/or information that may characterize or relate to one or more procedures, activities, tasks, and/or the like (e.g., experiment activities) performed or executed in a target environment (e.g., in an experimentation workspace).

Figure 5:
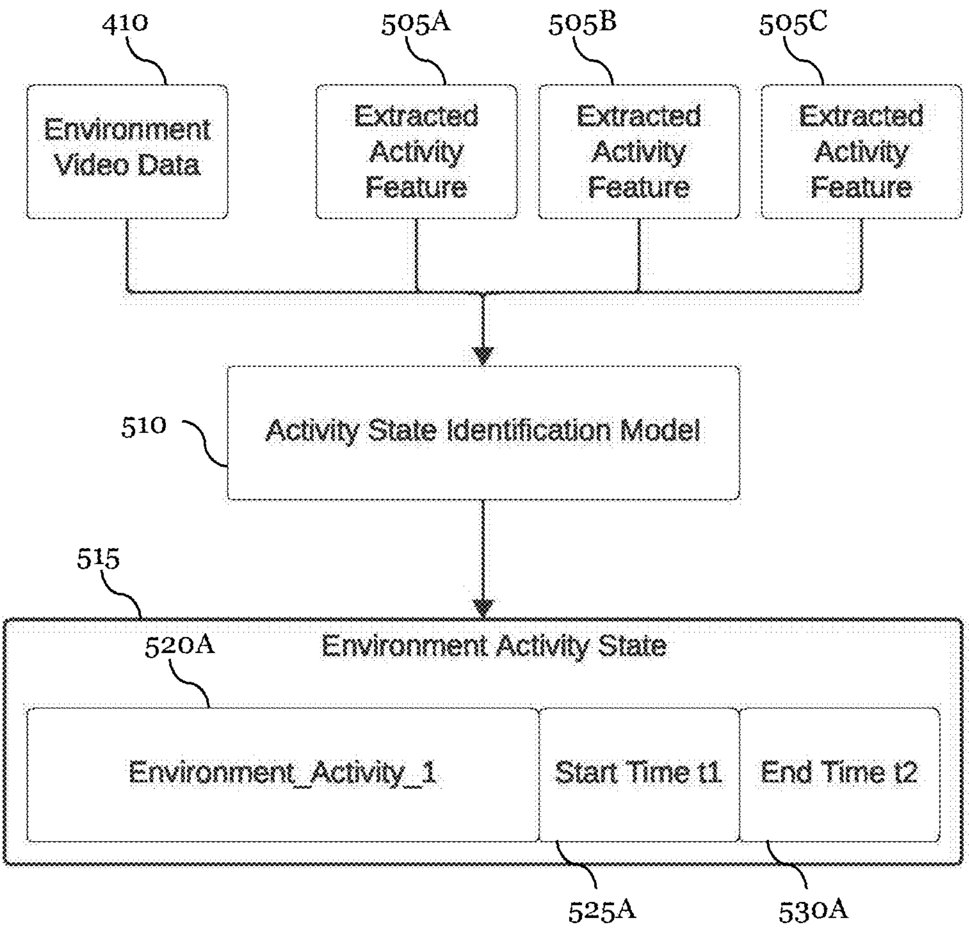
FIG. 5 illustrates a schematic representation of an identified environment activity state in accordance with one or more embodiments of the present application.

In a non-limiting example, as described with reference to FIGS. 4 and 5, a feature extraction model 415 may take environment video data 410 as an input and may provide activity features that relate to one or more apparatuses (e.g., a petri dish 420, a flask 425), one or more other objects (e.g., unsanitary surface 430) or one or more actors (e.g., a researcher 435). The activity features provided by feature extraction model 415 may include, as depicted in FIG. 5, experiment activity features 505A, 505B, and 505C. In some examples, feature extraction model 415 may be included at feature extraction engine 120 as described with reference to FIG. 1 and/or activity feature extractor 115A as described with reference to FIG. 1A. Additionally, feature extraction model 415 may, in some examples, be an example of a machine learning model.

Identification of Target Objects Using Extracted Activity Features

As part of constructing the second sequence of experiment activities, S220A may identify, from the extracted set of activity features, a set of target objects. A "target object" may refer to an object within a target environment (e.g., an experimentation workspace). Identifying the set of target objects may include identifying a respective activity feature or a respective subset of activity features that correspond to a respective target object (e.g., edges, points, surfaces, contours, shapes, patterns, identifiers, or properties associated with a target object). Additionally, or alternatively, identifying the set of target objects may include performing additional processing on the extracted set of activity features to identify the set of target objects. In some examples, S220A may track, based on the extracted set of activity features, the target set of objects.

In a non-limiting example, as described with reference to FIG. 4, feature extraction model 415 may output a set of activity features that relate to objects within a target environment 305 (e.g., an experimentation workspace). A system (e.g., experimentation anomaly detection service) may identify a respective activity feature or a respective subset of the activity features output by the feature extraction model 415 as corresponding to a respective object. For instance, the system may identify that a first activity feature or a first subset of activity features corresponds to petri dish 420 and that a second activity feature or a second subset of activity features corresponds to flask 425.

Detection of Experiment Activity Using Identified Target Objects

As part of constructing the second sequence of experiment activities, S220A may detect, using a machine learning model, an experiment activity based on the identified set of target objects and/or the collected environment data. A "machine learning model" may refer to a computational object used to determine patterns and relationships associated with a set of data. In the present disclosure, the machine learning model may take, as an input, collected environment data and/or activity features related to the set of target objects and may output a corresponding one or more experiment activities. In some examples, the detection of the experiment activity may be based on a tracking of the target set of objects. Examples in which the experiment activity is determined from the collected environment data may include temporal activity localization, in which the collected environment data is fed to the machine learning model and the experiment activity is output.

In a non-limiting example, as depicted with reference to FIG. 5, activity state identification model 510, which may be an example of a machine learning model, may receive environment video data 410 and extracted activity features 505A, 505B, and 505C, where extracted activity features 505A, 505B, and 505C may correspond to one or more target objects. The activity state identification model 510, using the provided environment video data 410 and extracted activity features 505A, 505B, and 505C, may output one or more environment activity states (e.g., one or more experiment activities). For instance, activity state identification model 510 may output an environment activity state 515 associated with an environment activity 520A that has a corresponding start time 525A and a corresponding end time 530A. It should be noted that activity state identification model 510 may be located at or utilized by activity identification engine 130 as described with reference to FIG. 1 and/or experiment activity detector 125A.

Addition of Experiment Activities to Constructed Sequence of Experiment Activities As part of constructing the second sequence of experiment activities, S220A may add the experiment activity to the second sequence of experiment activities. In some examples, S220A may manage the second sequence of experiment activities such that the corresponding experiment activities are ordered chronologically. For instance, S220A may manage the second sequence of experiment activities such that experiment activities associated with an earlier start time and/or an earlier end time may be located earlier within the sequence than experiment activities associated with a later start time and/or a later end time.

Figure 6:
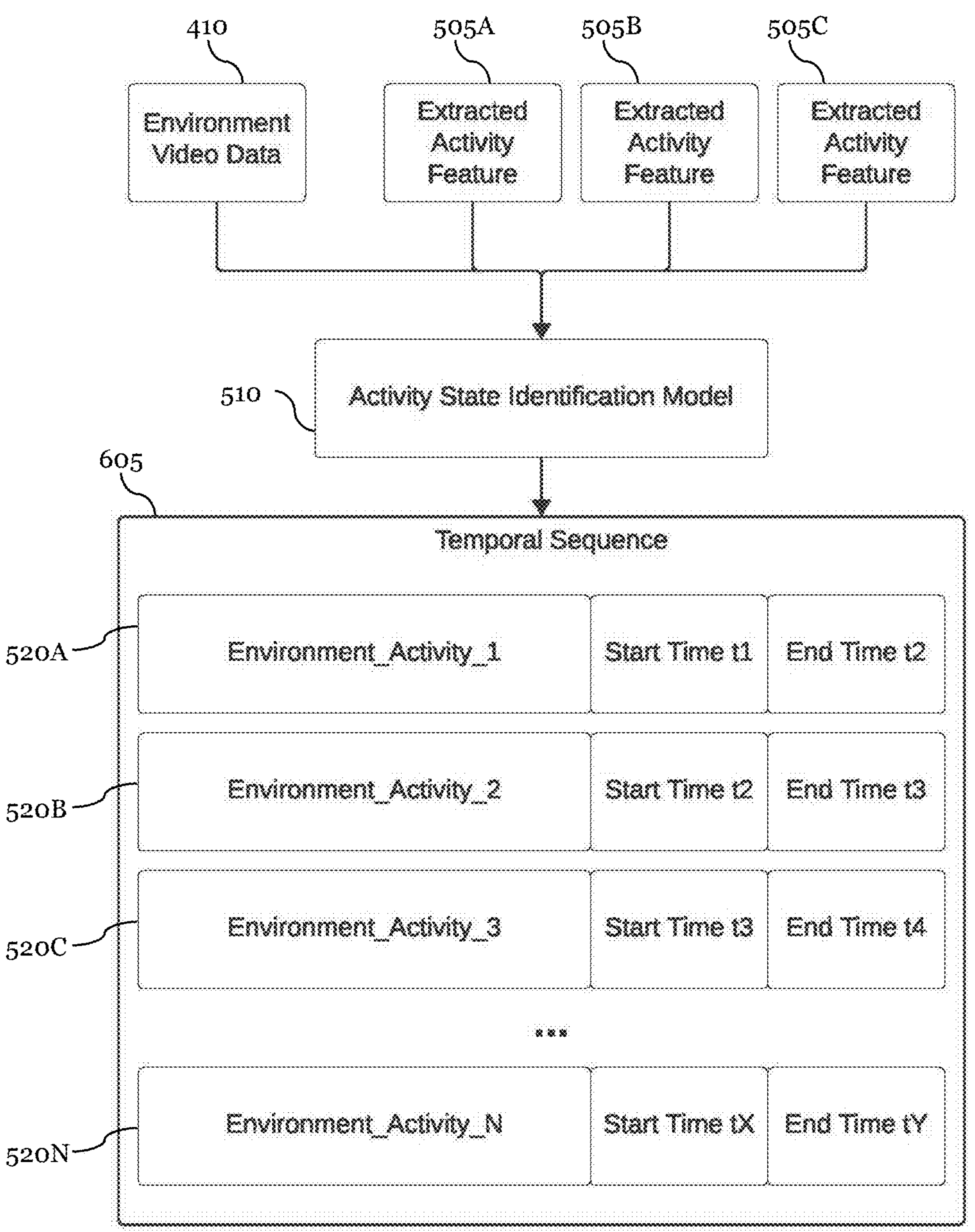
FIG. 6 illustrates a schematic representation of an identified temporal sequence of environment activity states in accordance with one or more embodiments of the present application.

In a non-limiting example, as described with reference to FIGS. 6 and 7, a system (e.g., experimentation anomaly detection service, alert generation engine 140) may construct, from the environment activity states output by activity state identification model 510, a second sequence of experiment activities 605 (e.g., a temporal sequence). The second sequence of experiment activities 605 may include environment activities 520A, 520B, 520C, and 520N (e.g., experiment activities). First environment activity 520A may be associated with an earliest start time, second environment activity 520B may be associated with a next earliest start time, third environment activity 520C may be associated with a next earliest start time, and Nth environment activity 520N may be associated with a latest start time. Additionally, or alternatively, first environment activity 520A may be associated with an earliest end time, second environment activity 520B may be associated with a next earliest end time, third environment activity 520C may be associated with a next earliest end time, and Nth environment activity 520N may be associated with a latest end time.

Object Annotation

As part of constructing the second sequence of experiment activities, S220A may generate one or more object annotations (e.g., object detection annotations) or each of the set of target objects, where the object annotations may be generated based on identifying the set of target objects. An "object annotation" may refer to a 2D or 3D geometric shape that defines the location and size of at least a portion of a target object within a target environment (e.g., an experimentation workspace). Examples of object annotations may include, but not be limited to, bounding boxes or sets of connected keypoints. In some examples, the object annotation may cover the entire target object. In other examples, the object annotation may cover a portion of the target object (e.g., a tip of the object). In some examples, the object annotation may correspond to a single activity feature of the set of activity features (e.g., an activity feature that defines a 2D or 3D shape over a target object) or may correspond to multiple activity features of the set of activity features (e.g., activity features that each define a respective point, edge, or face associated with the target object, where the points, edges, or faces may be combined to create an object annotation).

S220A may update an object annotation over a set of timepoints, where the shape and location of the object annotation may vary as the target object moves in the target environment. S220A may update the position of the object annotations relative to the one or more sensors that collect the environment data or using a fixed reference point within the target environment. It should be noted that the techniques described herein may be applied to multiple objects simultaneously (e.g., a first target object with a first object annotation or a second target object with a second object annotation). Additionally, or alternatively, multiple object annotations may be applied to a same target object.

In some examples, the object annotations may be generated via keypoint tracking (e.g., segmentation). For instance, S220A may identify a set of keypoints associated with a target object, where the set of keypoints correspond to distinctive features (e.g., activity features) of the target object, including corners, edges, points, or blobs within the received environment data. Tracking may include maintaining correspondence between the keypoints across consecutive timepoints (e.g., using deep learning-based methods and/or Kalman filters). The set of keypoints may be output as activity features or may be determined via processing of the set of activity features. In some examples, performing keypoint tracking may reduce extraneous space and may improve accuracy (e.g., for angled pipette tips) as compared to other techniques for tracking target objects.

2.3A Detecting an Anomalous Deviation

S230A, which includes detecting, by the one or more processors, an anomalous deviation from the first sequence of experiment activities (e.g., the extracted sequence of experiment activities) based on the second sequence of experiment activities (e.g., the constructed sequence of experiment activities), may function to detect if the actual sequence of tasks performed during the experiment differ from the expected sequence of tasks. An "anomalous deviation" (which may be referred to as an anomaly or a deviation) may refer to a departure from an expected sequence of experiment activities by the actual sequence of experiment activities that occur that may compromise or adversely affect the experiment being performed. In some examples, the anomalous deviation may be detected in real-time or near real-time (e.g., near when the environment data is first received from the one or more sensors and/or when experiment activities are determined). Alternatively, the anomalous deviation may be detected post-operation (e.g., after the experiment is over).

In a non-limiting example, as depicted with reference to FIG. 7, the first sequence of experiment activities 705 (e.g., a standard operating procedure) may have an anomalous deviation with reference to the second sequence of experiment activities 715 (e.g., a temporal sequence). For instance, a system (e.g., experimentation anomaly detection service) may detect that first environment activity 710A of first sequence of experiment activities 705 matches first environment activity 720A of second sequence of experiment activities 715 and that second environment activity 710B of first sequence of experiment activities 705 matches second environment activity 720B of second sequence of experiment activities 715. However, the system may detect that third environment activity 710C of first sequence of experiment activities 705 does not match the third environment activity 720C of second sequence of experiment activities 715. Instead, the third environment activity 720C of second sequence of experiment activities 715 may match the fourth environment activity 710D of first sequence of experiment activities 710. Accordingly, the system may determine that the third environment activity 710C of first sequence of experiment activities 705 has been skipped and may mark the skipping as an anomalous deviation.

In some examples, the target environment (e.g., the experimentation workspace) may be a training environment. In such examples, the experiment activities of the second sequence of experiment activities may be based on one or more actions of a trainee (e.g., a user, researcher, clinician, experimentalist) within the training environment. The one or more actions may include an erroneous action performed by a trainee within the training environment, where an anomalous deviation may be detected based on the erroneous action.

Anomaly Detection|Intersection or Non-Intersection of Target Objects

In examples in which S220A tracks a first subset of activity features for a first target object and tracks a second subset of activity features for a second target object, S220A may determine a spatial region that the first target object and the second target object each inhabit. For instance, S220A may determine a first spatial region for the first target object and a second spatial region for the second target object. A spatial region may refer to a point, a line, a 2D surface or area, or a 3D surface or volume.

In some examples, an anomalous deviation may be detected based on a location of the first spatial region relative to the second spatial region. For instance, S220A that an anomalous deviation has occurred if the first spatial region overlaps or intersects with a second spatial region (e.g., in a 2D plane or a 3D space). Alternatively, S220A may determine that the anomalous deviation has occurred if the first spatial region does not intersect or overlap with the second spatial region. Additionally, or alternatively, S230 may determine that the anomalous deviation has occurred if the first spatial region and the second spatial region are within a threshold distance from each other or outside of the threshold distance from each other. Additionally, or alternatively, S230A may determine that the anomalous deviation has occurred if the first spatial region and the second spatial region overlap by a threshold percentage or below the threshold percentage. S220A may detect an associated experiment activity based on one or more of these conditions and may determine the experiment activity does not match or is otherwise inconsistent with the sequence of experiment activities extracted from the digital artifact.

Anomaly Detection|Sequence Deviation

In some examples, detecting an anomalous deviation may be based on comparing the first sequence of experiment activities to the second sequence of experiment activities. Such comparing may include determining that an experiment activity within the first sequence has been skipped in the second sequence of experiment activities. For instance, S230A may determine that the second sequence of experiment activities includes an experiment activity subsequent to the skipped experiment activity without first including the skipped experiment activity. Additionally, or alternatively, comparing may include determining that an experiment activity within the second sequence of experiment activities does not match any experiment activity within the first sequence. For instance, S230A may determine that an experiment activity with the second sequence of experiment activities does not occur within the first sequence of experiment activities. Additionally, or alternatively, comparing may include determining that an experiment activity within the second sequence of experiment activities is temporally misaligned with a matching experiment activity within the first sequence. For instance, S230A may determine that the experiment activity occurs within the first sequence, but that the experiment activity occurs earlier or later in the first sequence than where it occurs for the second sequence. In some examples, S230A may determine that two experiment activities match if an identifier or a descriptor associated with the two experiment activities match.

2.4A Generating an Anomalous Deviation Detection Message

S240A, which includes generating a message indicating the anomalous deviation has been detected based on one or more features of the anomalous deviation, may function to alert to a user (e.g., the experimentalist, the researcher, the actor) that the actual sequence of tasks has deviated from the expected sequence of tasks. In some examples, the generating may serve to enable a correction of the anomalous deviation within the experimentation workspace. S240A may further provide the message to a user interface. The "features of the anomalous deviation" may refer to a type of anomalous deviation (e.g., fluid overcarry, visiting an incorrect well) or attributes of the anomalous deviation that are used in the generation of the message.

In a non-limiting example, as depicted with reference to FIG. 1, alert generation engine 140 may generate an alert and provide the alert to one or more alert devices and/or user devices, where the one or more alert devices and/or user devices may include a user interface. In another non-limiting example, as depicted with reference to FIG. 1A, message constructor 145A of experimentation anomaly detection service 101A may construct an anomalous deviation message 147A and may provide anomalous deviation message 147A to user interface 150A. In another non-limiting example, as described with reference to FIG. 7, a system (e.g., experimentation anomaly detection service) may detect the deviation between first sequence of experiment activities 705 and second sequence of experiment activities 715, may generate a message indicating the anomalous deviation, and may provide the message to a user interface.

Anomalous Deviation Detection Message|Generation

In some examples, to generate the message indicating the anomalous deviation, S240A may provide, to a language model (e.g., a large language model), an indication that the anomalous deviation has occurred. The language model may generate an associated explanation for the anomalous deviation and S240A may generate the message including the associated explanation. Alternatively, S240A may generate the message in a procedural manner (e.g., by mapping an identifier associated with the anomalous deviation to a corresponding message template and filling the message template with relevant information).

Figure 8A:
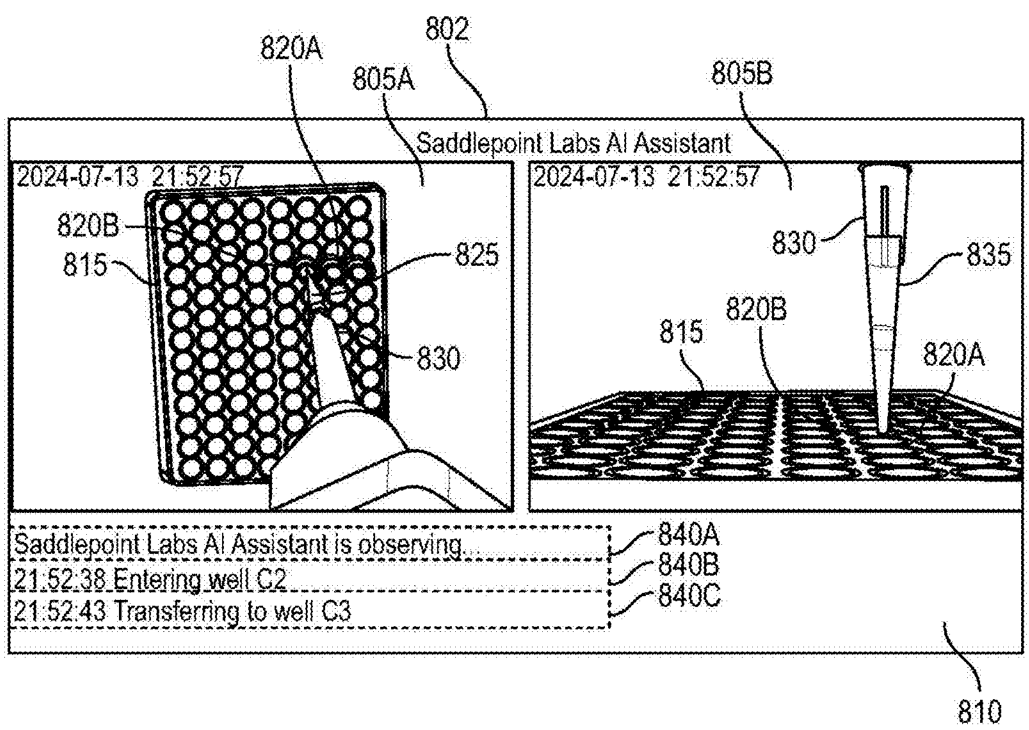
FIGS. 8A and 8B illustrate examples of views of an experiment tracking user interface in accordance with one or more embodiments of the present application.
Figure 8B:
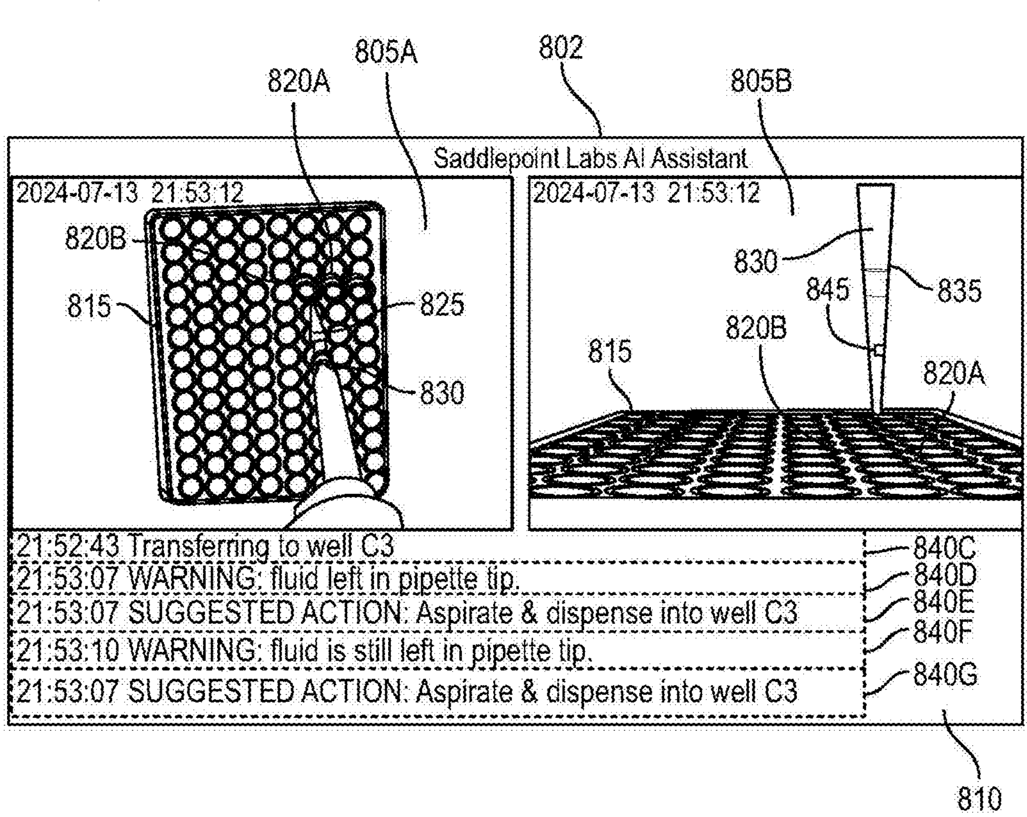

Additionally, or alternatively, S240A may generate a second message indicating a task or experiment activity for resolving the anomalous deviation and may provide the second message to the user interface. In a non-limiting example, as depicted in FIG. 8B, a displayed log within a user interface 802 may include a message 840D that provides an indication of an anomalous deviation (e.g., that fluid has been left in a pipette tip). Additionally, the displayed log may include a message 840E that may indicate a task that would resolve the anomalous deviation (e.g., aspirating and dispensing the fluid into a well which the fluid is intended for).

Anomalous Deviation Detection Example|Fluid Overcarry

In a first example of anomalous deviation detection, S220A may collect, at each timepoint of a set of timepoints and via one or more sensors, environment data and may identify, based on the environment data, a first object and a second object. For instance, as described herein, S220A may extract a set of activity features from the environment data and may identify the first object and the second object using the extracted set of activity features.

The first object may include an arrangement of cavities configured to store (e.g., hold) one or more fluids (e.g., one or more liquids). An example of an arrangement of cavities may include cavities arranged in a grid or arranged in a line. Alternatively, the arrangement of cavities may be arranged in a pattern distinct from the grid or the line. If the cavities are arranged in a grid, the grid of cavities may extend evenly spaced along a first direction. Additionally, the grid of cavities may extend evenly spaced along a second direction (e.g., a second direction orthogonal to the first direction). A "cavity" may refer to an enclosed or partially enclosed hollow space within the arrangement of cavities. The arrangement of cavities being configured to store one or more fluids may refer to each cavity being isolated from each other cavity of the arrangement of cavities such that when a fluid is provided to one cavity of the arrangement of cavities, it does not spread to other cavities of the arrangement of cavities or is otherwise retained within the cavity within which it was provided. In some examples, the first object may be a microplate (e.g., a microtiter plate, a microwell plate, a multiwell) and the arrangement of cavities may be an arrangement of wells (e.g., grid of wells) within the microplate. In a non-limiting example, user interface views 800A and 800B of FIGS. 8A and 8B, respectively, may depict a microplate 815 (e.g., the first object) with an arrangement of wells (e.g., an arrangement of cavities) including well 820A and 820B. In a non-limiting example, the arrangement of wells (e.g., grid of wells) may include 96, 384, or 1536 wells.

The second object may include a tip configured to distribute the one or more fluids among the arrangement of cavities. The second object may be an apparatus (e.g., a laboratory instrument) configured to aspirate, transfer, and dispense precise volumes of fluids among the arrangement of cavities as aided by the tip of the second object. In some examples, the second object may be a pipette or a micropipette and the tip may be a pipette tip. In a non-limiting example, FIGS. 8A and 8B may depict a micropipette 830 (e.g., the second object) with a tip configured to distribute one or more fluids among the arrangement of wells of microplate 815. In some examples, the second object may include multiple tips (e.g., a multichannel pipette), where each tip is configured to distribute the one or more liquids to a respective cavity of the arrangement of cavities. It should be noted that the tip of the second object may be manipulated manually (e.g., via a user) or may be manipulated in an automated fashion (e.g., by a robot, such as a manual pipetting and liquid handling robot) without deviating from the scope of the present disclosure.

In some examples, S220A may track the first object and the second object. For instance, S220A may detect, from the set of activity features, a first spatial region of the second object and may track, over the set of timepoints, a position of the first spatial region relative to the arrangement of cavities of the first object. In a non-limiting example, as depicted in FIGS. 8A and 8B, a system (e.g., the experimentation anomaly detection service) may detect a first area corresponding to first object annotation 835 over the tip of micropipette 830. The tip of the micropipette 830 may move between a first timepoint associated with FIG. 8A and a second timepoint associated with FIG. 8B. Accordingly, the position and/or shape of the first object annotation 835 may be adjusted to represent the updated location of the tip of the micropipette 830. If the micropipette is a multichannel pipette with multiple tips, each tip may have an associated object annotation or may have a single object annotation for all tips.

In some examples, S220A may detect a tip-associated error. For instance, S220A may detect, at least partially within the first spatial region, a second spatial region indicating the presence of a droplet within the tip of the second object. In a non-limiting example, as depicted in FIGS. 8A and 8B, the system may not detect a droplet within the tip of micropipette 830 during the first timepoint associated with FIG. 8A. Accordingly, no second spatial region may be present within the first timepoint of FIG. 8A. However, during the second timepoint associated with FIG. 8B, the system may detect a second spatial region corresponding to object annotation 845 that indicates the presence of a droplet within the tip of the micropipette 830. The droplet within the second object annotation 845 may be present due to fluid overcarry. For instance, the micropipette 830, when moving fluid from well 820A to well 820B may fail to dispense all the fluid retrieved from well 820-*a* into well 820B. Alternatively, the micropipette 830, after moving the fluid from well 820A to well 820B may aspirate at least some of the fluid within well 820B and may retain the fluid when retreating from well 820-*b*. Additional non-limiting examples of tip associated errors may include the presence of the droplet on the tip of the second object, the presence of bubbles within the one or more fluids within the tip, the presence of a foreign body (e.g., a dust particle) within the tip, or a quantity of liquid within the tip that satisfies a threshold liquid quantity (e.g., too much or too little liquid). Additionally, or alternatively, a tip-associated error may occur if the tip of the second object makes contact with a side of a cavity that the tip is visiting.

In some examples, S230A may detect that the tip of the second object is retreating from a cavity of the arrangement of cavities over a same timepoint of the set of timepoints in which the tip-associated error is occurring. Detecting that the tip of the second object is retreating may include detecting that the first spatial region is retreating from the cavity of the arrangement. In some examples, the retreat of the tip of the second object from the arrangement of cavities (e.g., while the tip-associated error is occurring) may be recorded as an experiment activity and added to the second sequence of experiment activities. In a non-limiting example, in a first timepoint associated with FIG. 8A, the tip of micropipette 830 may be within well 820B and, accordingly, the corresponding first object annotation 835 may be located relatively close to well 820B. However, in a second timepoint associated with FIG. 8B, the tip of micropipette 830 may be outside of well 820B and, accordingly, the corresponding first object annotation 835 may be located farther from well 820B. Determining that the first spatial region is farther from well 820B and/or the microplate 815 may be an example of detecting that the tip of micropipette 830 is retreating.

Detecting that the tip of the second object is retreating from the cavity of the arrangement of cavities over the same timepoint in which the tip-associated error is occurring may be an example of detecting an anomalous deviation. In some examples, the detection of the tip-associated error and the retreat from the cavity of the arrangement of cavities may be recorded as separate experiment activities. In such examples, detecting that tip-associated error occurs within the same timepoint as retreating from the cavity, and thus that an anomalous deviation is present, may include comparing the start and end times of the experiment activities. In other examples, the detection of the tip-associated error and the retreat from the cavity of the arrangement of cavities may be recorded as a single experiment activity.

In some examples, S240A may provide, to a user interface upon detecting the anomalous deviation, a message indicating that the tip-associated error has occurred based on S230A detecting that the tip of the second object is retreating from the cavity of the arrangement of cavities over the same timepoint in which the tip-associated error occurs.

In a non-limiting example, as depicted in FIGS. 8A and 8B, user interface 802 may include a display log 810, where display log 810 may display messages received from an experimentation anomaly detection service. When a user (e.g., an actor, a clinician, a researcher, an experimentalist) initializes the user interface, the display log 810 may present a first message 840A indicating that the experimental anomaly detection service is active. The user may initially place the micropipette 830 in well 820A (e.g., to aspirate a fluid within well 820A). Accordingly, display log 810 may present a second message 840B indicating that this experiment activity is occurring. After entering well 820A, micropipette 830 may retreat from well 820A and may enter 820B (e.g., to dispense the fluid retrieved from well 820A). Display log 810 may present a third message 840C indicating that the tip of the micropipette 830 has moved from well 820A to well 820B.

After visiting well 820B, the tip of micropipette 830 may retreat from well 820B with a droplet within the tip of micropipette 830. Accordingly, display log 810 may present a fourth message 840D indicating that the droplet is present within the tip of micropipette 830 (e.g., a fourth message 840D indicating that fluid is left in the pipette tip). Additionally, display log 810 may present a fifth message 840E indicating that aspirating and dispensing into well 820B may enable the droplet to be removed from the tip of micropipette 830. If the user does not comply, the display log 810 may present a sixth message 840F indicating that the droplet is still present within the tip of micropipette 830 and a seventh message indicating that aspirating and dispensing into well 820B may enable the droplet to be removed from the tip of micropipette 830. In some examples, updates to display log 910 may occur in real-time or near real-time. Alternatively, in examples in which a comparison of the first sequence of experiment activities and the second experiment activities occurs after all experiment activities are completed, the display log 910 may be updated as footage from the experiment activities is replayed.

Examples of generating anomalous messages may include a message being generated immediately after detection of a bubble within the tip of the second object. Accordingly, a corrective action (e.g., a correction) may be performed such that a user (e.g., a trainee) may remove the bubble from the tip of the second object. Alternatively, generating the anomalous message may include generating a message a few seconds after the bubble is present within the tip of the second object. An associated corrective action may include the user repeating the associated task in a different cavity. Alternatively, generating the anomalous message may include detecting the bubble in real time and including an information message that is shown to a user (e.g., a trainee). However, the corrective action may occur after the results from the cavity are interpreted (e.g., after the experiment is completed).

Additionally, S220A may provide, to the user interface, the first object annotation and the second object annotation and may display the first object annotation and the second object annotation within the display section. For instance, in a non-limiting example as depicted with reference to FIGS. 8A and 8B, user interface 802 may include a display section 805B. Within the display section 805, the first object annotation 835 and the second object annotation 845 may be presented overlaid with environment data collected by one or more sensors. In some examples, updates to display section 805B may occur in real-time or near real-time. Alternatively, in examples in which a comparison of the first sequence of experiment activities and the second experiment activities occurs after all experiment activities are completed, the display section 805B may be updated as footage from the experiment activities is replayed.

In some examples, the first object annotation may include a set of connected keypoints that track a shape and orientation of the tip of the second object between timepoints. For instance, as depicted in FIG. 8A, the first object annotation 835 may include a set of connected keypoints. When moving from a first timepoint associated with FIG. 8A to a second timepoint associated with FIG. 8B, the set of connected keypoints may be adjusted to track the shape and orientation of the tip of micropipette 830.

In some examples, a first subset of sensors of the one or more sensors collecting the environment data may include a first camera positioned at a first angle and a second subset of sensors of the one or more sensors may include a second camera positioned at a second angle different from the first angle. For instance, as depicted in FIG. 3, one or more sensors may include first camera 310A and second camera 310B each configured to collect environment data. First camera 310A may be positioned at a first angle and second camera 310B may be positioned at a different angle from the first camera 310A. In some examples, the first camera or the second camera may have different magnifications (e.g., the first camera may have a higher or lower magnification than the second camera). Additionally, or alternatively, the first camera and/or the second camera may be configured to adjust a respective zoom.

In examples in which the first camera and the second camera collect environment data, the display section may depict the environment data collected by the first camera and the user interface may include a second display section that depicts the environment data collected by the second camera. For instance, display section 805B of user interface 802 may depict environment data collected by a first camera (e.g., camera 310A) and display section 805B of user interface 802 may depict environment data collected by a second camera (e.g., camera 310B).

In examples in which the second camera is present, S220A may generate a third object annotation over the tip of the second object and may update the third object annotation over the set of timepoints. In a non-limiting example, as depicted in FIGS. 8A and 8B, a system (e.g., an experimentation anomaly detection service) may detect, from the set of activity features a third spatial region over the tip of the second object and may generate a third object annotation 825 over the tip of micropipette 830 that may differ from first object annotation 835. The third object annotation 825 may have a first shape and position during a first timepoint associated with FIG. 8A and may have a second shape and position during a second timepoint associated with FIG. 8B. If the micropipette is a multichannel pipette with multiple tips, each tip may have an associated object annotation or may have a single object annotation for all tips.

In examples in which the second camera is present, S220A may provide, to the user interface, the third object annotation and may display the third object annotation within the second display section of the user interface. For instance, display section 805A may display the third object annotation 825 overlaid with the collected environment data. In some examples, updates to display section 805A may occur in real-time or near real-time. Alternatively, in examples in which a comparison of the first sequence of experiment activities and the second experiment activities occurs after all experiment activities are completed, the display section 805A may be updated as footage from the experiment activities is replayed.

Anomalous Deviation Detection Example|Cavity Arrangement Pattern Deviation

In a second example of anomalous deviation detection, S220A may collect, at each timepoint of a set of timepoints and via one or more sensors, environment data and may identify, based on the environment data, a first object and a second object. For instance, as described herein, S220A may extract a set of activity features from the environment data and may identify the first object and the second object using the extracted set of activity features. The first object may include an arrangement of cavities configured to store (e.g., hold) one or more fluids (e.g., one or more liquids). For instance, the first object may be a microplate and the arrangement of cavities may be a grid of wells within the microplate. The second object may include a tip configured to distribute the one or more fluids among the arrangement of cavities. For instance, the second object may be a pipette or a micropipette and the tip may be a pipette tip or a micropipette tip. In a non-limiting example, user interface views 900A and 900B of FIGS. 9A and 9B may depict a microplate 942 (e.g., the first object) with a grid of wells (e.g., an arrangement of cavities) and a micropipette 925 (e.g., the second object) with a tip. The various wells within the grid of microplate 942 may be displayed in display section 905 (e.g., wells 910A, 910B, and 910C). In some examples, the second object may include multiple tips (e.g., a multichannel pipette), where each tip is configured to distribute the one or more liquids to a respective cavity of the arrangement of cavities. It should be noted that the tip of the second object may be manipulated manually (e.g., via a user) or may be manipulated in an automated fashion (e.g., by a robot, such as a manual pipetting and liquid handling robot) without deviating from the scope of the present disclosure.

In some examples, the first sequence of experiment activities extracted from the digital artifact (e.g., the standard operating procedure) may indicate a pattern for visiting the arrangement of cavities for the second object, where the pattern for visiting the arrangement indicates to visit a second cavity of the grid of cavities subsequent to visiting a first cavity of the arrangement of cavities. A "pattern for visiting the arrangement of cavities" may refer to an intended sequence of cavities that the tip of the second object is to visit. Additionally, "visiting" a cavity may refer to interacting with (e.g., aspirating from or dispensing into) the cavity. In a non-limiting example, as illustrated with FIGS. 9A and 9B, the pattern may indicate that the tip of micropipette 925 is to visit well 910A first, followed by well 910B, and finally well 910C.

In some examples, S220A may detect that the tip of the second object has visited the first cavity of the arrangement of cavities and may detect, after the tip of the second object has visited the first cavity, that the tip of the second object is moving towards or visiting a third cavity of the arrangement of cavities. To detect that the tip of the second object is moving towards the third cavity, S220A may use a Kalman filter to predict a trajectory of the tip and to, in some cases, preemptively identify errors. In a non-limiting example, as illustrated with reference to FIGS. 9A and 9B, a system (e.g., an experimentation anomaly detection service) may detect that the tip of micropipette 925 has visited well 910A and that the tip of micropipette 925 is moving towards well 910C. If the second object is a multichannel pipette, S220A may detect the multiple tips of the second object visiting multiple cavities of the arrangement of cavities simultaneously.

Additionally, S230A may detect that the tip of the second object visits the third cavity of the arrangement of cavities without detecting that the tip of the second object has visited the second cavity of the grid of cavities and may thus detect a break from the pattern for visiting the arrangement of cavities. In a non-limiting example, as illustrated with reference to FIGS. 9A and 9B, the system may detect that the micropipette 925 visits well 910C immediately subsequent to visiting well 910A. However, the pattern for visiting the arrangement of cavities may indicate that micropipette 925 is to visit well 910B immediately subsequent to visiting well 910A.

Detecting a break from the pattern may enable S230A to detect an anomalous deviation. In some examples, to detect the break, each instance at which the micropipette 925 visits a well may be recorded as a respective experiment activity. By comparing the recorded experiment activities with the sequence of experiment activities extracted from the digital artifact (e.g., the standard operating procedure), S230A may determine that an anomalous deviation has occurred.

S240A, upon detecting the anomalous deviation, may provide a message to a user interface indicating that the tip of the second object has failed to visit the second cavity of the grid of cavities. In a non-limiting example, as illustrated with FIGS. 9A and 9B, the user interface 901 may display an alert on the user interface 901 indicating the failure of micropipette 925 to visit well 910B.

In some examples, the first object may be overlaid with a third object that includes a set of light sources. The set of light sources may be fixed or may be adjusted digitally (e.g., if the third object has a screen on which various arrangements of light sources can be generated digitally). Each of the set of light sources may be configured to display a light onto a respective cavity of the arrangement of cavities. For instance, if the third object has a screen, the third object may be configured to adjust the display on the screen such that a light source is present below each cavity of the arrangement of cavities. Each cavity of the arrangement of cavities, in such examples, may include a transparent material (e.g., a transparent material that enables the light from each light source to be viewed). In such examples, the message provided upon detection of the anomalous deviation has been detected may include a toggling of the respective light source of the third cavity of the arrangement of cavities (e.g., toggling the light source from being off to being red, such as making a portion of the display go red). In some examples, a base of the first object may be transparent. It should be noted that the set of light sources may be used for guidance (e.g., providing a respective color to a respective cavity to indicate that it is the next cavity to be visited within the pattern of cavities to visit).

Figure 9A:
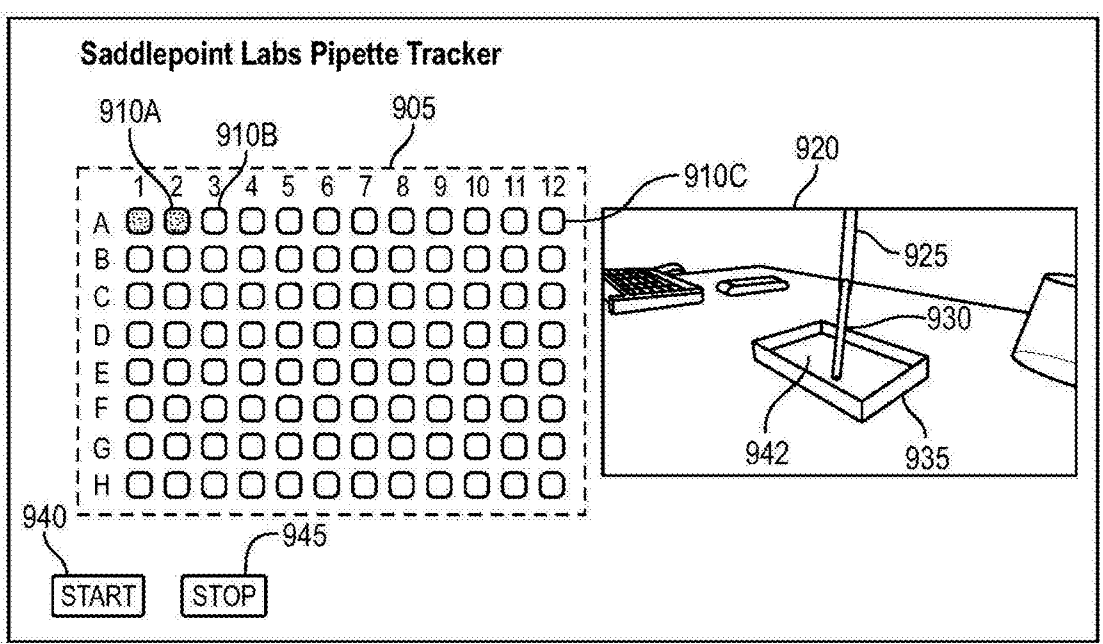
FIGS. 9A and 9B illustrate examples of views of an experiment tracking user interface in accordance with one or more embodiments of the present application.
Figure 9B:
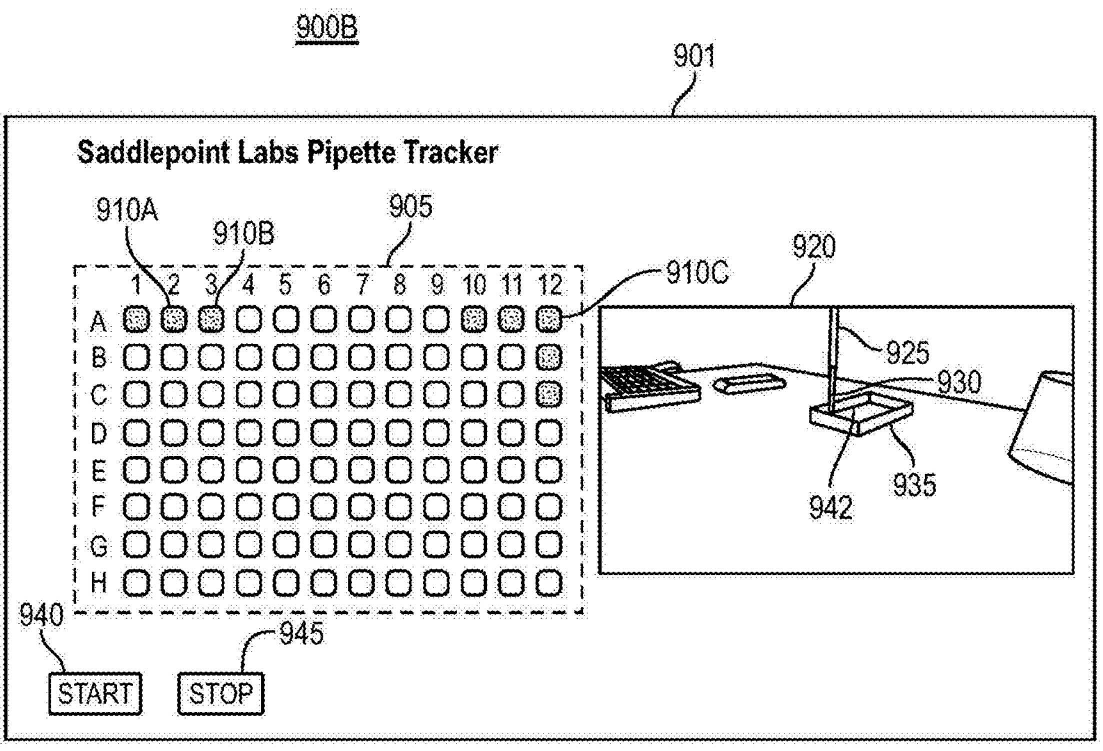

In some examples, the user interface may include a display section that depicts the environment data collected by the one or more sensors. In such examples, tracking the second object may include S220A detecting, from the set of activity features, an orientation of the second object and tracking, based on the orientation of the second object, a path between the tip of the second object and a surface of the first object. In a non-limiting example, as depicted in FIGS. 9A and 9B, user interface 901 may include a display section 920. Additionally, a system (e.g., experimentation anomaly detection service) may detect an orientation of micropipette 925 and may determine from the orientation, a path 930 between the tip of micropipette 925 and a surface of microplate 942. The path 930 may be adjusted between a first timepoint associated with FIG. 9A and a second timepoint associated with FIG. 9B as an orientation of micropipette 925 changes and/or as a position of micropipette 925 and microplate 942 changes. In some examples, updates to display section 920 may occur in real-time or near real-time. Alternatively, in examples in which a comparison of the first sequence of experiment activities and the second experiment activities occurs after all experiment activities are completed, the display section 920 may be updated as footage from the experiment activities is replayed.

In some such examples, S220A may provide, to the user interface, a representation of the path between the tip of the second object and the surface of the first object and may display the representation of the path within the display section of the user interface. For instance, in a non-limiting example, display section 920 of user interface 901 may display a representation of the path 930 between the tip of micropipette 925 and microplate 942.

Additionally, or alternatively, S220A may detect, from the set of activity features, a first spatial region over the first object and may track a position of the first spatial region relative to a position of the one or more sensors. In a non-limiting example, as depicted in FIGS. 9A and 9B, a system e.g., experimentation anomaly detection service) may detect a first spatial region associated with first object annotation 935 over microplate 942. The first object annotation 935 may be adjusted between a first timepoint associated with FIG. 9A and a second timepoint associated with FIG. 9B as a position of the microplate 942 changes. In some examples, the first object annotation over the first object may be generated using a YOLO 3D algorithm. Additionally, or alternatively, an object annotation associated with the second object may be generated using the YOLO 3D algorithm.

In some such examples, S220A may provide, to the user interface, the first object annotation and may display the first object annotation within the display section of the user interface. For instance, in a non-limiting example, display section 920 of user interface 901 may display the first object annotation 935 over microplate 942.

In some examples, the user interface may include a display section that depicts the arrangement of cavities. In such examples, S220A may provide, to the user interface, an indication of a first subset of the cavities of the arrangement of cavities that have been visited by the tip of the second object and may update the display section to display the first subset of the cavities of the arrangement of cavities that have been visited by the tip of the second object. In a non-limiting example, as depicted in FIGS. 9A and 9B, user interface 901 may include a display section 905 that displays an arrangement of the grid of wells associated with microplate 942. At a first timepoint associated with FIG. 9A, well 910A may be included in the first subset of wells that have been visited by the tip of micropipette 925 and wells 910B and 910C may be included in a second subset of wells that have not yet been visited by micropipette 925. The first subset of wells may be indicated with a first fill and the second subset of wells be indicated in display section 905 with a second fill distinct from the first fill. At a second timepoint associated with FIGS. 9B, wells 910A, 910B, and 910C may each be included in the first subset of wells visited by the tip of micropipette 925. Accordingly, user interface 901 may update display section 905 to display the updated subset of wells visited by the tip of micropipette 925 at the second timepoint. In some examples, updates to display section 905 may occur in real-time or near real-time. Alternatively, in examples in which a comparison of the first sequence of experiment activities and the second experiment activities occurs after all experiment activities are completed, the display section 905 may be updated as footage from the experiment activities is replayed.

In some examples, user interface 901 may include a first user interface control element 940 and a second user interface control element 945. First user interface control element 940 may be configured to indicate to the experimentation anomaly detection service that it should begin performing tracking on the wells of microplate 940 and/or that the user interface 901 should begin updating display section 920 to show visited wells. Second user interface control element 945 may be configured to indicate to the experimentation anomaly detection service that it should stop performing tracking on the wells of microplate 940 and/or that the user interface 901 should stop updating display section 920 to show visited wells. Additionally, or alternatively, first user interface control element 940 may be used to begin recording updates made to display section 905 and/or 920 and second user interface control element 945 may be used to stop recording updates made to display section 905 and/or 920 and to log or store the recording for later replay (e.g., for error diagnosis or educational purposes). Additionally, or alternatively, in examples in which user interface 901 is a post-procedure interface, first user interface control element 940 may be used to start a playback of a previously performed sequence of experiment activities and second user interface 945 may be used to pause the playback or to stop the playback.

In some examples, the user interface 901 may support recovery from errors with automating plate map remapping. For instance, if a user erroneously visits a cavity that is different from an expected cavity, the user interface 901 may provide a message that asks the user if they would like to perform a remapping from the expected cavity to the one the user erroneously visited. The user may provide a confirmation or a rejection via one or more user interface control elements (e.g., an accept button and a reject button). The user interface may further provide user interface control elements to indicate whether a guide (e.g., a well plate guide) is present under the first object (e.g., under the well plate), a number of cavities associated with the well plate (e.g., 96, 384), or a device associated with the well plate (e.g., a monitor, a tablet).

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method, comprising:

at an experimentation anomaly detection service:

collecting, by one or more processors and at each timepoint of a set of timepoints and via one or more sensors, environment data from an experimentation workspace;

identifying, by the one or more processors and based at least in part on the environment data, a first object and a second object, wherein:

the first object comprises a arrangement of cavities configured to store one or more fluids; and the second object comprises a tip configured to distribute the one or more fluids among the arrangement of cavities;

detecting, by the one or more processors, a tip-associated error, wherein the tip-associated error comprises a presence of a droplet within the tip of the second object, the presence of the droplet on the tip of the second object, the presence of bubbles within the one or more fluids within the tip, the presence of a dust particle within the tip, a quantity of liquid within the tip that satisfies a threshold liquid quantity, or a combination thereof;

detecting, by the one or more processors, that the tip of the second object is retreating from a cavity of the arrangement of cavities over a same timepoint of the set of timepoints in which the tip-associated error is present; and generating, by the one or more processors, a message indicating that the droplet is present within the tip of the second object based at least in part on detecting that the tip of the second object is retreating from the cavity over the same timepoint of the set of timepoints in which the tip-associated error is occurring, thereby enabling a removal of the droplet from the tip of the second object.

2. The computer-implemented method according to claim 1, further comprising:

generating, by the one or more processors, a second message indicating the presence of the bubbles within the one or more fluids within the tip, the presence of the dust particle within the tip, or the quantity of liquid within the tip that satisfies the threshold liquid quantity based at least in part on detecting that the tip of the second object is retreating from the cavity over the same timepoint of the set of timepoints in which the tip-associated error is occurring.

3. The computer-implemented method according to claim 1, further comprising:

detecting, by the one or more processors, a second tip-associated error, wherein the second tip-associated error comprises a presence of a second droplet on the tip of the second object;

detecting, by the one or more processors, that the tip of the second object is retreating from the cavity of the arrangement of cavities over a same timepoint of the set of timepoints in which the second tip-associated error is present; and generating, by the one or more processors, a second message indicating that the second droplet is present on the tip of the second object based at least in part on detecting that the tip of the second object is retreating from the cavity over the same timepoint of the set of timepoints in which the second tip-associated error is occurring, thereby enabling a removal of the second droplet from the tip of the second object.

4. The computer-implemented method according to claim 1, further comprising:

providing, by the one or more processors and to a user interface, a first object annotation and a second object annotation, wherein the first object annotation represents the tip of the second object and the second object annotation represents the tip-associated error; and displaying, by the one or more processors, the first object annotation and the second object annotation within a display section of the user interface, wherein the display section depicts the environment data collected by the one or more sensors.

5. The computer-implemented method according to claim 4, wherein:

a first subset of sensors of the one or more sensors comprises a first camera positioned at a first angle;

a second subset of sensors of the one or more sensors comprises a second camera positioned at a second angle different from the first angle;

the display section depicts the environment data collected by the first camera;

the user interface comprises a second display section that depicts the environment data collected by the second camera; and the computer-implemented method further comprises, at the experimentation anomaly detection service:

providing, by the one or more processors and to the user interface, a third object annotation that represents the tip of the second object; and displaying, by the one or more processors, the third object annotation within the second display section of the user interface.

6. The computer-implemented method according to claim 5, wherein the second camera has a higher magnification than the first camera or wherein the first camera or the second camera are configured to adjust a respective zoom.

7. The computer-implemented method according to claim 4, wherein the first object annotation comprises a set of connected keypoints that track a shape and orientation of the tip of the second object between timepoints.

8. The computer-implemented method according to claim 1, further comprising:

identifying a pattern for visiting the arrangement of cavities for the second object, wherein the pattern for visiting the arrangement indicates to visit a second cavity of the arrangement of cavities subsequent to visiting a first cavity of the arrangement of cavities;

detecting, by the one or more processors, that the tip of the second object has visited the first cavity of the arrangement of cavities;

detecting, by the one or more processors and after the tip of the second object has visited the first cavity of the arrangement of cavities, that the tip of the second object is moving towards or visiting a third cavity of the arrangement of cavities without detecting, after detecting that the tip of the second object has visited the first cavity, that the tip of the second object has visited the second cavity of the arrangement of cavities; and generating a second message indicating that the tip of the second object has failed to visit the second cavity of the arrangement of cavities.

9. The computer-implemented method according to claim 8, wherein:

the first object is overlaid with a third object, the third object comprises a set of light sources, each of the set of light sources is configured to display a light onto a respective cavity of the arrangement of cavities, each cavity of the arrangement of cavities comprises a transparent material, and the second message comprises the respective light source for the third cavity being toggled.

10. The computer-implemented method according to claim 1, further comprising:

at the experimentation anomaly detection service:

providing, by the one or more processors and to a user interface, a representation of a path between the tip of the second object and the surface of the first object, wherein the user interface comprises a display section that depicts the environment data collected by the one or more sensors; and displaying, by the one or more processors, the representation of the path within the display section of the user interface.

11. The computer-implemented method according to claim 1, further comprising:

at the experimentation anomaly detection service:

providing, by the one or more processors and to a user interface, a first object annotation that represents a form of the first object, wherein the user interface comprises a display section that depicts the environment data collected by the one or more sensors; and displaying, by the one or more processors, the first object annotation within the display section of the user interface.

12. The computer-implemented method according to claim 1, further comprising:

at the experimentation anomaly detection service:

providing, by the one or more processors and to a user interface, an indication of a first subset of the cavities of the arrangement of cavities that have been visited by the tip of the second object, wherein the user interface comprises a display section that depicts an arrangement of the arrangement of cavities of the first object; and updating, by the one or more processors, the display section to display the first subset of the cavities of the arrangement of cavities that have been visited by the tip of the second object.

13. The computer-implemented method according to claim 1, wherein:

the first object is a microplate;

the arrangement of cavities of the first object are a grid of wells;

the second object is a pipette or a micropipette; and the tip of the second object is a pipette tip or a micropipette tip.

14. The computer-implemented method according to claim 1, wherein the second object comprises a plurality of tips, wherein each of the plurality of tips is configured to distribute the one or more liquids to a respective cavity of the arrangement of cavities.

15. The computer-implemented method according to claim 1, further comprising:

tracking, by the one or more processors and based at least in part on the collected environment data, the first object and the second object, wherein detecting the tip-associated error is based at least in part on tracking.

16. The computer-implemented method according to claim 1, further comprising:

at the experimentation anomaly detection service:

providing, by the one or more processors and to a language model, an indication that the tip-associated error has occurred; and generating, by the language model, an explanation for the tip-associated error, wherein the message comprises the explanation for the tip-associated error.

17. The computer-implemented method according to claim 1, further comprising:

at the experimentation anomaly detection service:

generating, by the one or more processors and based at least in part on detecting the tip-associated error, a second message indicating a task for resolving the tip-associated error; and providing, by the one or more processors, the generated second message to a user interface.

18. The computer-implemented method according to claim 1, wherein:

the experimentation workspace is a training environment;

the tip-associated error is based at least in part on one or more actions of a trainee within the training environment; and the one or more actions comprise an erroneous action performed by a trainee within the training environment, wherein the tip-associated error is detected based at least in part on the erroneous action.

19. A computer-implemented system, comprising:

one or more processors;

a memory; and a computer-readable medium operably coupled to the one or more processors, the computer-readable medium having computer-readable instructions stored thereon that, when executed by the one or more processors, cause a computing device to perform operations comprising:

at an experimentation anomaly detection service:

collecting, by the one or more processors and at each timepoint of a set of timepoints and via one or more sensors, environment data from an experimentation workspace;

identifying, by the one or more processors and based at least in part on the environment data, a first object and a second object, wherein:

the first object comprises an arrangement of cavities configured to store one or more fluids; and the second object comprises a tip configured to distribute the one or more fluids among the arrangement of cavities;

detecting, by the one or more processors, a tip-associated error, wherein the tip-associated error comprises a presence of a droplet within the tip of the second object, the presence of the droplet on the tip of the second object, the presence of bubbles within the one or more fluids within the tip, the presence of a dust particle within the tip, a quantity of liquid within the tip that satisfies a threshold liquid quantity, or a combination thereof;

detecting, by the one or more processors, that the tip of the second object is retreating from a cavity of the arrangement of cavities over a same timepoint of the set of timepoints in which the tip-associated error is present; and generating, by the one or more processors, a message indicating that the droplet is present within the tip of the second object based at least in part on detecting that the tip of the second object is retreating from the cavity over the same timepoint of the set of timepoints in which the tip-associated error is occurring, thereby enabling a removal of the droplet from the tip of the second object.

20. A computer-program product comprising a non-transitory machine-readable storage medium storing computer instructions that, when executed by processing circuitry, perform operations comprising:

at an experimentation anomaly detection service:

collecting, by the processing circuitry and at each timepoint of a set of timepoints and via one or more sensors, environment data from an experimentation workspace;

identifying, by the processing circuitry and based at least in part on the environment data, a first object and a second object, wherein:

the first object comprises an arrangement of cavities configured to store one or more fluids; and the second object comprises a tip configured to distribute the one or more fluids among the arrangement of cavities;

detecting, by the processing circuitry, a tip-associated error, wherein the tip-associated error comprises a presence of a droplet within the tip of the second object, the presence of the droplet on the tip of the second object, the presence of bubbles within the one or more fluids within the tip, the presence of a dust particle within the tip, a quantity of liquid within the tip that satisfies a threshold liquid quantity, or a combination thereof;

detecting, by the processing circuitry, that the tip of the second object is retreating from a cavity of the arrangement of cavities over a same timepoint of the set of timepoints in which the tip-associated error is present; and generating, by the processing circuitry, a message indicating that the droplet is present within the tip of the second object based at least in part on detecting that the tip of the second object is retreating from the cavity over the same timepoint of the set of timepoints in which the tip-associated error is occurring, thereby enabling a removal of the droplet from the tip of the second object.

* * * * *